US008272958B2

(12) United States Patent
Smith et al.

(10) Patent No.: US 8,272,958 B2
(45) Date of Patent: Sep. 25, 2012

(54) AUTOMATED MULTIPLAYER GAME TABLE WITH UNIQUE IMAGE FEED OF DEALER

(75) Inventors: Philip Stephen Smith, Las Vegas, NV (US); Ezra Christopher MacKenna, Las Vegas, NV (US); Donald T. Bush, Henderson, NV (US); Daymon B. Savage, Las Vegas, NV (US)

(73) Assignee: Shuffle Master, Inc., Las Vegas, NV (US)

( * ) Notice: Subject to any disclaimer, the term of this patent is extended or adjusted under 35 U.S.C. 154(b) by 2022 days.

(21) Appl. No.: 10/764,995

(22) Filed: Jan. 26, 2004

(65) Prior Publication Data

US 2005/0164762 A1 Jul. 28, 2005

(51) Int. Cl.
*A63F 13/00* (2006.01)

(52) U.S. Cl. ........................................ 463/33; 463/11

(58) Field of Classification Search .............. 463/11–13, 463/31–33

See application file for complete search history.

(56) References Cited

U.S. PATENT DOCUMENTS 3,595,987 A 7/1971 Vlahos
4,007,487 A 2/1977 Vlahos
4,026,555 A 5/1977 Kirschner et al.
4,100,569 A 7/1978 Vlahos
4,344,085 A 8/1982 Vlahos
4,397,509 A 8/1983 Miller et al.
4,445,114 A 4/1984 Stubben
4,508,353 A 4/1985 Meyer et al.
4,530,499 A 7/1985 Breslow et al.
4,614,342 A 9/1986 Takashima
4,643,421 A 2/1987 Meyer et al.
4,658,247 A 4/1987 Aubin
4,687,200 A 8/1987 Shirai
4,724,307 A 2/1988 Dutton et al.
4,738,451 A 4/1988 Logg
4,887,819 A 12/1989 Walker
4,926,327 A 5/1990 Sidley
4,995,615 A 2/1991 Cheng
5,090,708 A 2/1992 Gerlitz et al.
5,120,057 A 6/1992 Kitaue
5,125,671 A 6/1992 Ueda et al.
5,149,104 A 9/1992 Edelstein
5,150,899 A 9/1992 Kitaue
5,159,549 A 10/1992 Hallman, Jr. et al.
5,221,083 A 6/1993 Dote ............................ 463/32
5,288,078 A 2/1994 Capper et al.
5,317,505 A 5/1994 Karabed et al.
5,414,256 A 5/1995 Gurner et al.
(Continued)

FOREIGN PATENT DOCUMENTS

WO WO 96/30856 10/1996
(Continued)

*Primary Examiner* — David L Lewis
*Assistant Examiner* — Robert Mosser
(74) *Attorney, Agent, or Firm* — TraskBritt

(57) ABSTRACT

A method and apparatus are used to simultaneously display a virtual dealer and a dynamic visual background image in connection with a multi-player video platform simulating and effecting play of a casino table card game. The dealer imagery is in the foreground and the background is behind the dealer. The background is either a live video feed from the casino, live feed from another location or event or pre-recorded image sequences. The various videos are keyed or masked and layered together using known video production technology.

3 Claims, 12 Drawing Sheets

U.S. PATENT DOCUMENTS

| | | | |
|---|---|---|---|
| 5,453,758 | A | 9/1995 | Sato |
| 5,470,080 | A | 11/1995 | Naka et al. |
| 5,521,616 | A | 5/1996 | Capper et al. |
| 5,586,766 | A | 12/1996 | Forte et al. |
| 5,586,936 | A | 12/1996 | Bennett et al. |
| 5,605,334 | A | 2/1997 | McCrea, Jr. |
| 5,616,078 | A | 4/1997 | Oh |
| 5,688,174 | A | 11/1997 | Kennedy |
| 5,695,189 | A | 12/1997 | Breeding et al. |
| 5,726,706 | A | 3/1998 | Walsh |
| 5,735,742 | A | 4/1998 | French |
| 5,745,166 | A | 4/1998 | Rhodes et al. |
| 5,779,546 | A | 7/1998 | Meissner et al. |
| 5,781,647 | A | 7/1998 | Fishbine et al. |
| 5,803,453 | A | 9/1998 | Stephan et al. |
| 5,831,527 | A | 11/1998 | Jones, II et al. |
| 5,879,235 | A | 3/1999 | Kaneko et al. |
| 5,919,090 | A | 7/1999 | Mothwurf |
| 5,923,364 | A | 7/1999 | Rhodes et al. |
| 5,934,998 | A | 8/1999 | Forte et al. |
| 5,941,769 | A | 8/1999 | Order |
| 5,961,121 | A | 10/1999 | Brown |
| 5,976,019 | A | 11/1999 | Ikeda et al. |
| 6,068,258 | A | 5/2000 | Breeding et al. |
| 6,093,103 | A | 7/2000 | McCrea, Jr. |
| 6,117,012 | A | 9/2000 | McCrea, Jr. |
| 6,126,166 | A | 10/2000 | Lorson et al. |
| 6,139,014 | A | 10/2000 | Breeding et al. |
| 6,149,154 | A | 11/2000 | Grauzer et al. |
| 6,154,131 | A | 11/2000 | Jones, II et al. |
| 6,165,069 | A | 12/2000 | Sines et al. |
| 6,217,447 | B1 | 4/2001 | Lofink et al. |
| 6,254,096 | B1 | 7/2001 | Grauzer et al. |
| 6,270,404 | B2 | 8/2001 | Sines et al. |
| 6,313,871 | B1 | 11/2001 | Schubert |
| 6,325,373 | B1 | 12/2001 | Breeding et al. |
| 6,394,898 | B1 | 5/2002 | Nagao et al. |
| 6,460,848 | B1 | 10/2002 | Soltys et al. |
| 6,466,220 | B1 | 10/2002 | Cesana et al. |
| 6,469,747 | B1 | 10/2002 | Rai et al. |
| 6,517,435 | B2 | 2/2003 | Soltys et al. |
| 6,517,436 | B2 | 2/2003 | Soltys et al. |
| 6,519,283 | B1 | 2/2003 | Cheney et al. |
| 6,520,857 | B2 | 2/2003 | Soltys et al. |
| 6,527,271 | B2 | 3/2003 | Soltys et al. |
| 6,530,836 | B2 | 3/2003 | Soltys et al. |
| 6,530,837 | B2 | 3/2003 | Soltys et al. |
| 6,532,297 | B1 | 3/2003 | Lindquist |
| 6,533,276 | B2 | 3/2003 | Soltys et al. |
| 6,533,662 | B2 | 3/2003 | Soltys et al. |
| 6,568,678 | B2 | 5/2003 | Breeding et al. |
| 6,579,180 | B2 | 6/2003 | Soltys et al. |
| 6,579,181 | B2 | 6/2003 | Soltys et al. |
| 6,588,751 | B1 | 7/2003 | Grauzer et al. |
| 6,595,857 | B2 | 7/2003 | Soltys et al. |
| 6,607,443 | B1 | 8/2003 | Miyamoto et al. |
| 6,638,161 | B2 | 10/2003 | Soltys et al. |
| 6,651,981 | B2 | 11/2003 | Grauzer et al. |
| 6,651,982 | B2 | 11/2003 | Grauzer et al. |
| 6,651,985 | B2 | 11/2003 | Sines et al. |
| 6,652,379 | B2 | 11/2003 | Soltys et al. |
| 6,655,684 | B2 | 12/2003 | Grauzer et al. |
| 6,658,750 | B2 | 12/2003 | Scheibner et al. |
| 6,661,425 | B1 | 12/2003 | Hiroaki |
| 6,663,490 | B2 | 12/2003 | Soltys et al. |
| 6,731,416 | B2 * | 5/2004 | Hazzard .......................... 359/24 |
| 7,128,651 | B2 * | 10/2006 | Miyamoto et al. .............. 463/35 |
| 2002/0147987 | A1 * | 10/2002 | Reynolds et al. ............. 725/110 |
| 2002/0169013 | A1 | 11/2002 | Serizawa et al. |
| 2003/0199316 | A1 | 10/2003 | Miyamoto et al. |
| 2004/0063482 | A1 * | 4/2004 | Toyoda ........................... 463/11 |

FOREIGN PATENT DOCUMENTS

WO WO 00/51076 8/2000

* cited by examiner

Multiplayer Platform (MPP) Game Engine (Main Program or Dealer)

Multiplayer Platform (MPP) Game Display

AUTOMATED MULTIPLAYER GAME TABLE WITH UNIQUE IMAGE FEED OF DEALER

BACKGROUND OF THE INVENTION

1. Field of the Invention

The present invention relates to the field of automated electronic table games, and particularly to automated games having images of a dealer of a card game displayed to players.

2. Background of the Art

In the gaming industry, significant gambling occurs at live table games that use playing cards and a live dealer. Exemplary live table games include blackjack, poker, poker variants such as LET IT RIDE® stud poker, baccarat, casino war and other games. There are a number of proprietary or specialty live table card games which have developed, such as pai gow poker, LET-IT-RIDE® stud poker, THREE CARD POKER® game, FOUR CARD POKER™ game, Caribbean stud poker and others. These and many other games all involve play using playing cards. The cards are dealt by a live dealer to the players, to a flop and/or to the dealer. The use of playing cards provided by a live dealer has a number of associated limitations and disadvantages that have long plagued the casino industry. Some of these are of general concern to all or most playing card games. Others are problems associated with the use of playing cards in particular games. Some of the principal concerns and problems are discussed below.

The use of playing cards at live table games typically involves several operational requirements that are time-consuming. These operations are conveniently described as collecting, shuffling, dealing and reading of the cards. In many card games there is also a step of cutting the deck after it has been shuffled. In the collecting operation, a live dealer typically collects the cards just played at the end of a hand of play. This is done in preparation for playing the next hand of cards. The cards must often be collected in the specific order in which they had appeared in the play of the game and must also be collected in a specific orientation, such as all cards being in a facedown or face-up condition. The cards also are typically straightened into a stack with the long sides and short sides aligned. These manipulations take time and are not typically appreciated by either the dealer or players as enhancing the play and entertainment value of the game. The use of physical cards also adds a regular cost to play of the game in the wear on decks of cards that must be replaced every few hours. In many games the cards collected at the end of the hand are deposited in a discard rack that collects the played cards until the time a new stack is obtained or the stack is shuffled. In some games the cards are immediately shuffled into the stack either manually or using a card shuffling machine. More typically, the cards are collected and then shuffling is performed later by the dealer or a shuffling device controlled by the dealer.

When shuffling is needed, it involves a break in the action of the table game and consumes a significant amount of time. Shuffling is also the most time consuming operation in preparing for the next hand. Thus, shuffling is of substantial financial significance to the casino industry because it requires significant time and reduces the number of hands that can be played per hour or other period of time. The earnings of casinos are primarily dependent upon the total number of hands played. This is true because the casino on average wins a certain percent of the amounts wagered, and many or most casinos are open on a 24-hour basis. Thus, earnings are limited by the number of hands that can be played per hour. In light of this there has been a significant and keen interest by casino owners to develop practices that allow more games to be played in a given amount of time. Accomplishing this without detracting from the players' enjoyment and desire to play the game is a challenging and longstanding issue with casino owners and consultants in the gaming industry. The use of high quality shuffling machines, such as those produced by Shuffle Master, Inc. (Las Vegas, Nev.) as shown in U.S. Pat. Nos. 6,655,684; 6,651,982; 6,588,751; 6,658,750; 6,568,678; 6,325,373; 6,254,096; 6,149,154; 6,139,014; 6,068,258; and 5,695,189 that have significantly reduced the problem in down time, but there is still the need for a human operator and a human dealer in the use of these shuffling devices for casino table games.

The amount of time consumed by collecting, shuffling and dealing is also of significance in private card games because it also delays action and requires some special effort to perform. In private games there is also some added complexity due to card players remembering or figuring out which player had previously dealt and who should now shuffle and re-deal the cards as needed.

In addition to the time delay and added activity needed to collect, shuffle and deal cards, there is typically some time devoted to cutting the deck of cards which have been shuffled and which are soon to be dealt. This traditional maneuver helps to reduce the risk that the dealer who has shuffled the cards may have done so in a way that stacks the deck in an ordered fashion that may favor the dealer or someone else playing the game. Although cutting the deck does not require a large amount of time, it does take some time. The amount of time spent on cutting also somewhat reduces the frequency at which hands of the card game can be played and introduces another physical step in which human error or design can be introduced, such as dropping and exposing the cards or cutting the deck in a specific position to control the outcome in a fixed deck.

In the gaming industry there is also a very significant amount of time and effort devoted to security issues that relate to play of the casino games. Part of the security concerns stem from frequent attempts to cheat during play of the games. Attempts to cheat are made by players, dealers, or more significantly by dealers and players in collusion. This cheating seeks to affect the outcome of the game in a way that favors the dealer or players who are working together. The amount of cheating in card games is significant to the casino industry and constitutes a major security problem that has large associated losses. The costs of efforts to deter or prevent cheating are very large and made on a daily basis. Many of the attempts to cheat in the play of live table card games involve some aspect of dealer or player manipulation of cards during collection, shuffling, cutting or dealing of cards. Thus, there is a need for methods and apparatus that can be used in the play of live table card games that reduce the ability of the dealer and/or players to cheat by manipulation of playing cards. Of greatest concern are schemes whereby the deck is stacked and the stacked deck is used to the collusive player's advantage. Stacked decks represent huge potential losses since the player is aware of the cards which will be played before play occurs and can optimize winnings by increasing bets for winning hands and decreasing bets for losing hands. It is also desirable to provide decks or groups of cards where card counters are disadvantaged because of the reduction in their ability to track distributions of cards in the group of cards being used for play. Continuous shufflers, in which cards are reintroduced into the group of cards being used, the introduction being random throughout the entire group, helps to eliminate that aspect of improper behavior at the gaming table.

Casinos have recognized that their efforts to reduce cheating would be improved if the casino had comprehensive information on the cards which have been played, the amounts bet, the players and dealers involved and other information about actions which have taken place at the card tables. This is of particular importance in assessing the use of stacked decks. It is also important where card tracking is occurring. Additional explanation about card tracking is discussed below. The information desired by the casinos includes knowing the sequence and exact cards being dealt. It would be even more advantageous to the casino if physical cards and live dealers could be eliminated, as this would remove almost all major existing methods of fraud from casino table card games.

Some attempts have been made to record card game action. The best current technology involves cameras that are mounted above the tables to record the action of the card games. This approach is disadvantaged by the fact that not all cards dealt are easily imaged from a camera position above the table because some or all of the cards are not dealt face-up, or are hidden by overlying cards. Although many blackjack games are sufficiently revealing to later determine the order of dealt cards, others are not. Other card games, such as poker, have hands that are not revealed. The covered cards of the players do not allow the order of dealt cards to be ascertained from an above-table camera or on table cameras, as exemplified by U.S. Pat. Nos. 6,313,871 to Schubert, 5,781,647 to Fishbine et al., and numerous patents assigned to MindPlay, LLC (e.g., U.S. Pat. Nos. 6,663,490; 6,652,379; 6,638,161; 6,595,857; 6,579,181; 6,579,180; 6,533,662; 6,533,276; 6,530,837; 6,530,836; 6,527,271; 6,520,857; 6,517,436; 6,517,435; and 6,460,848.

Even where cameras are used, their use may not be effective. Such cameras may require time-consuming and tedious human analysis to go over the videotapes or other recordings of table action or require the use of software that is complex and imprecise. In some present systems, some human study may be needed just to ascertain the sequence of cards dealt or to determine the amount of betting or to confirm software determinations from camera read data. Such human analysis is costly and cannot economically be used to routinely monitor all action in a casino card room or table game pit.

For the above reasons, the video camera monitoring techniques have found very limited effectiveness as a routine approach for identifying cheating. There has also been relatively limited use as a serious analytical tool because of the difficulty of analysis. Such camera surveillance techniques are also of only limited effectiveness as a deterrent because many of the people involved with cheating have a working knowledge of their limitations and utilize approaches which are not easily detectable by such systems.

Another use of video camera monitoring and recording has been made in the context of analyzing card table action after someone has become a cheating or card counting suspect. The tape recordings serve as evidence to prove the cheating scheme. However, in the past, this has generally required other evidence to initially reveal the cheating so that careful analysis can be performed. More routine and general screening to detect cheating has remained a difficult and continuing problem for casinos. This is also a human intensive review, with both video monitoring security personnel and live personnel watching the players and apprehending players at the tables.

Another approach to reducing security problems utilizes card shoes having card detection capability. Card shoes hold a stack of cards containing typically from one to eight decks of cards. The cards are held in the card shoe in preparation for dealing and to secure the deck within a device that restricts access to the cards and helps prevent card manipulations. Card shoes can be fit with optical or magnetic sensors that detect the cards as they are being dealt. Some of the problems of security analysis using above-table cameras is reduced when the sequence of cards dealt can be directly determined at the card shoe using optical or magnetic sensors.

One advantage of such card shoes is that the card sequence information can be collected in a machine-readable format by sensing the specific nature (suit and count) of each card as they are dealt out of the card shoe. However, most such card shoes have special requirements for the cards being used. Such cards must carry magnetic coding or are specifically adapted for optical reading. This increases the cost of the cards and may not fully resolve the problems and difficulties in obtaining accurate information concerning sequence information. The automated data collecting card shoes also do not have an inherent means for collecting data on the assignment of the card to a particular player or the dealer. They further do not collect data on the amounts bet. These factors thus require some other manual or partially automated data collection system to be used, or require that time-consuming human analysis be performed using video tapes as explained above.

The use in blackjack of numerous card decks, such as six decks, has been one strategy directed at minimizing the risk of card tracking or counting, especially when the set of cards is cut relatively shallowly so that many cards are not allowed into play from the set. Such tracking should be contrasted with card counting strategies which are typically less accurate and do not pose as substantial a risk of loss to the casino. Use of numerous card decks in a stack along with proper cut card placement can also reduce the risk of effective card counting. However, it has been found that multiple decks are not sufficient to overcome the skilled gambler's ability to track cards and turn the advantage against the house.

Card tracking can be thought of as being of two types. Sequential card tracking involves determination of the specific ordering of the card deck or decks being dealt. This can be determined or closely estimated for runs of cards, sequences of cards forming a portion or portions of a stack. Sequential card tracking can be devastating to a casino since a player taking advantage of such information can bet large in a winning situation and change the odds in favor of the player and against the casino.

Slug tracking involves determining runs of the deck or stack that show a higher frequency of certain important cards. For example, in the play of blackjack there are a relatively large number of 10-count cards. These 10-count cards are significant in producing winning blackjack hands or 20-count hands that are also frequently winning hands. Gamblers who are proficient in tracking slugs containing large numbers of 10-count cards can gain an advantage over the house and win in blackjack.

There is also a long-standing problem in the play of blackjack which concerns the situation when the dealer receives a blackjack hand in the initial two cards dealt. If the dealer has a 10-count card or ace as the up card, then it is possible for the dealer to have a blackjack. If the dealer does have a blackjack, then there is no reason to play the hand out since the outcome of the hand is already determined without further dealing. If the hand is fully played out, and the dealer then reveals that the dealer has received a blackjack hand, then a significant amount of time has been wasted. It also causes players to often be upset when a hand is played out to no avail. In many casinos the waste of time associated with playing out hands with a winning dealer blackjack has lead to various approaches that attempt to end the hand after the initial deal. Some of these allow the dealer to look at the down card to make a determination whether a blackjack hand has been dealt to the dealer. This looking is commonly called “peeking” and is an operation that has been the source of numerous cheating schemes involving dealers and players who work in collusion. In such cheating associated with peeking at the down card, the dealer cheats in collaboration with an accomplice-player. This cheating is frequently accomplished when the dealer signals the accomplice using eye movements, hand movements or other signals. If a dealer does not peek, then he does not know the value of his hand until after the players have completed their play. If the dealer does peek, then he can use such eye movements, hand movements or other techniques to convey instructions to his accomplice-player. These signals tell the accomplice what hand the dealer has been dealt. With this knowledge of the dealer’s hand, the accomplice has improved odds of winning and this can be sufficient to turn the long-term odds in favor of the accomplice-player and against the casino. Many casinos do not allow the dealer to look at or inspect the down card until all insurance wagers have been made or declined.

There have also been a substantial number of apparatuses devised to facilitate the peeking procedure or render it less subject to abuse. Such peeking devices are intended to allow determination of whether the dealer has received a blackjack hand; however, this is done without revealing to the dealer what the down card is unless it makes a blackjack. Some of these devices require a special table with a peeking device installed in the table. Others allow the down card to be reviewed using a tabletop device in which the card is inserted. These systems and others involve the use of special playing cards. These devices and methods generally add greater costs and slow the play of the game. The slowed play often occurs to such a degree that it offsets the original purpose of saving time associated with playing out possible dealer blackjack hands. The prior attempts have often ended up unacceptable and are removed.

Another notable problem suffered by live table games is the intimidation which many novice or less experienced players feel when playing such games. Surveys have indicated that many new or less experienced people who come to a casino are inclined to play slot machines and video card games. These people feel intimidation at a live table game because such games require quick thinking and decision making while other people are watching and waiting. This intimidation factor reduces participation in table games.

A further issue that has developed in the casino business is the public’s increasing interest in participating in games that have a very large potential payoff. This may be in part a result of the large amount of publicity surrounding the state operated lotteries. News of huge payoffs is read with keen interest and creates expectations that gaming establishments should provide games with large jackpots. One approach has been the networked or progressive slot machines that use a centralized pool of funds contributed by numerous players. These slot machine systems are relatively more costly to purchase and operate. For many gamblers, this approach is not particularly attractive. This lack of attractiveness may be due to the impersonal and solitary nature of playing slot machines. It may alternatively be for other reasons. Whatever the reason, the public is clearly interested in participating in games that can offer potential jackpots that are very large. Table card games have not been able to satisfactorily address this interest. The continued diminishment in the percent of people who play live table games indicates the need for more attractive games and game systems that address to public’s interests.

Further problems associated with live table card games are the costs associated with purchasing, handling and disposal of paper and plastic playing cards. Casinos pay relatively favorable prices for card decks, but the decks roughly cost about $1 per deck at this time. Each casino uses decks for a very limited period of time, typically only one shift, and almost always less than one day. After this relatively brief life in the limelight, the decks are disposed of in a suitable manner. In some cases they can be sold as souvenirs. This is done after the cards are specially marked or portions are punched out to show they have been decommissioned from a casino. This special marking allows the cards to be sold as souvenirs while reducing the risk that they will later be used at the card tables in a cheating scheme which involves slipping a winning card into play at an appropriate point. In other cases the playing cards are simply destroyed or recycled to eliminate this last risk. In any case, the cost of playing cards for a casino is significant and can easily run in the hundreds of thousands of dollars per year.

In addition to the above problems, there are also significant costs associated with handling and storing the new and worn playing cards. Sizable rooms located in the casino complexes are needed just to store the cards as they are coming and going. Thus, the high costs of casino facilities further exacerbate the costs associated with paper and plastic playing cards.

The most significant cost in operation of gaming apparatus is personnel costs. A number of attempts have been made to reduce time requirements for not only the dealers, relief dealers, but also for the supervisors, managers, security and the other staff that are directly or indirectly involved in the operation or maintenance of the games.

A number of attempts have been made to design and provide fully automated gaming machines that duplicate play of casino table card games. These attempts have ranged from and included the highly successful video poker slot games to the mildly successful slot-type blackjack game (for single players). In those systems, the individual player sits at an individual machine, inserts credits/currency/coins, and plays a one-on-one game that is controlled by a processor in the machine or to which the machine is distally connected (networked). These machines are common in casinos, but do not duplicate the ambience of the casino table game with multiple players present.

Another type of attempt for simulating casino table card games is the use of a bank of individual player positions associated with a single dealer position in an attempt to simulate the physical ambiance of a live casino table card game. Such systems are shown in U.S. Pat. No. 4,397,509 to Miller et al., U.S. Pat. No. 4,614,342 to Takashima, U.S. Pat. No. 4,995,615 to Cheng, U.S. Pat. No. 5,470,080 to Nakua et al., and published U.S. patent applications 2002/0169013 (Serizawa), 2003/0199316 (Miyamoto), and the like. These systems have a video display of a dealer and have individual monitors for display of the players’ hands and the dealer hands. The architecture of these systems has generally been designed on a unique basis for each game, and there tends to be a main computer/processor that drives all elements of the game, or two computers/processors that distribute the video control of the dealer image and the remainder of the game elements between the two distinct computer/processors. This tends to maximize the cost of the system and tends to provide a slow system with high processing power demands to keep the operation working at speeds needed to maximize use and profit from the machines.

U.S. Pat. Nos. 6,651,985 and 6,270,404, both to Sines et al., are titled “Automated System for Playing Live Casino Table Games Having Tabletop Changeable Playing Card Displays and Play Monitoring Security Features.” U.S. Pat. No.

6,165,069 to Sines et al., is similarly titled "Automated System for Playing Live Casino Table Games Having Tabletop Changeable Playing Card Displays and Monitoring Security Features."

The latter two patents, U.S. Pat. Nos. 6,270,404 and U.S. Pat. No. 6,165,069, are related as continuations and, therefore, have identical disclosures. U.S. Pat. No. 6,651,985 claims continuation-in-part status from the earliest application, which is U.S. Pat. No. 6,165,069.

Sines, U.S. Pat. No. 6,651,985, describes the use of a live dealer, even though virtual cards are used. There is no virtual dealer display and no software or architecture controls needed for a virtual dealer display. There are distinct display components for the players' hands and dealer's hand. Looking at FIGS. 23, 24 and 25 (which are identical to the same figures in U.S. Pat. No. 6,651,895, discussed above), it appears that at least for betting functions, the system operates with parallel communication to the player input stations. (See wire connections shown in FIGS. 24 and 25 to the Player Bet Interfaces 196, 198, 201 and 203.) These Bet Interface Circuits (an alternative description in the text, at column 14, lines 29-56 and column 15, lines 5-12) do not indicate that these are anything more than circuits, and no processing intelligence is specifically disclosed. This appears to be merely an interface with player controls without any processing function disclosed. The Sines' system in these patents also requires bet sensors on the table.

U.S. Pat. No. 6,607,443 (Miyamoto et al., and assigned to Kabushiki Kaisha SEGA Enterprises) and Published U.S. application 2003/0199316 A1 (also assigned to KKSE) and particularly FIGS. 1, 2, 3, 7, 9, 10, 11, 12 and 13, disclose a virtual blackjack table system. The main objective of this patent is to have optical data that enables the Sega system to read hand signals of players, such as calls for "hits" and "stand" signals. The hardware architecture in FIG. 15, as described in the specification at column 11, lines 29-54 show that there are distinct CPUs for the (audio and video, 280, 281, 282, 283) that is driven by the sub-CPU, which is, in turn, connected to the main CPU 201, with an additional sub-CPU 204 directing the motion sensor system 13, 14, 15, 16, and 32 . There are distinct processing blocks for the sound (22), the video (21), the main CPU 201, and the subsystems (13), as well as the components already noted for the motion sensors/facial recognition sensors system.

U.S. Pat. No. 5,221,083 (Dote, SEGA Enterprises, Ltd.) describes a blackjack automated game system that has a reflected video image of a dealer and also has individual satellite player positions, with individual CRT monitors for each player. There is no disclosure of the type of information processing hardware in the system.

U.S. Pat. Nos. 5,934,998 (Forte and Sines, unassigned) and 5,586,766 (Forte and Sines, assigned to Casinovations, Inc.) describe the use of physical cards and a physical dealer, with no dealer display, on a blackjack table that has a CPU driven system. FIGS. 6-10 show circuit construction and hardware considerations in the design of the system, including communication architecture. This system provides a count display (e.g., LED display) at each player position to show the player count and dealer count (as appropriate) that is determined from reading of the physical cards. Physical playing chips are also used; with no credit wagering capability is shown.

U.S. Pat. No. 5,159,549 describes a system that provides a multiple player game data processing unit with wager accounting. There are distinct player stations with player input on wagering. There may be a limited amount of intelligence at player stations (see column 4, line 1 through column 7, line 55), but there are multiple lines to each player station.

U.S. Pat. No. 4,614,342 (Takashima) teaches an electronic game machine with distinct display units (CRT screens) at the player positions and the dealer position. The dealer screen (10) does not show an image of a dealer, but shows the dealer's card(s) and game information. There are typical player input controls (16) at each player position. The system provided is more like a bank of slot systems than a card table. In addition to a dealer data processor (6), each player position includes a player data processor CPU (30) with player memory (32). The central dealer computer apparently polls the individual player data processors to obtain the status of the events at each position (column 4, lines 1-60; and column 3, lines 8-17).

U.S. Pat. No. 5,586,936 (Bennett et al., assigned to Mikohn Gaming) teaches a ticketless control system for monitoring player activity at a table game, such as blackjack. Physical cards and physical chips are shown. Player identity cards identify each player entering play at a table, and a separate ticket printer issues a results ticket (500) at the end of play or reads the ticket at the beginning of play. There is no distinct intelligence apparent at each player position, and there is a central CPU that controls the system (e.g., FIG. 8). Physical chips and a real dealer are apparently used. A phone line (630) is connected from each player position to the CPU (820) through a communications port (814).

U.S. Pat. No. 4,995,615 to Cheng describes a method and apparatus for performing fair card play. There are individual player positions with individual screens (12) provided for each player. There are three vertical, card-display screens (11, 12, 13) shown for "receiving instructions from the computer to display sequentially the cards being distributed throughout the processing of the play . . . " (Column 4, lines 4-13). There is no visual display of a dealer, there are individual player image panels, and no details of the architecture are shown or described.

U.S. Pat. Nos. 5,879,235; 5,976,019; and 6,394,898, assigned to SEGA Enterprises, Ltd. relate to non-card game systems, such as horse race simulators or ball game simulators (e.g., roulette). There is no dealer or croupier simulation. The horse race simulator is an automated miniature track with physically moving game elements. The point of interest is in evaluating the architecture to see how the intelligence is distributed between the player stations and the wagering screen. The system again shows individual monitors at each player position (80, 81) and no dealer display. The schematics of the electrical architecture in FIG. 11 shows a main board that also includes a Picture Control Section (95), Sound Control Section (96), and a communication control section (107). There is a distinct picture output board (108).

U.S. Pat. No. 6,607,443 (Miyamoto et al., Kabushiki Kaisha Sega Enterprises) shows an automated gaming table device in which there is an upright screen that displays a dealer's image. The particular purpose described in this patent is for recognition of sound and hand movement by players, but there is some description of the dealer screen display. For example, Column 7, line 45 through column 9, line 8 describes the images of the dealer provided on the main central screen 7 during game play. There is disclosure only to the effect that a dealer's image and particular expressions and body position are provided (along with sound) of the dealer. There are no details at all with respect to the background, the combination of images or the like.

U.S. Pat. No. 5,221,083 (Dote, Sega Enterprises, Ltd.) shows an automated gaming machine with a vertical image of a dealer presented to players sitting at a kiosk-type counsel. The screen or upright portion 2 has an image of a dealer 4 on a background or georama 13 that is formed on the inner surface of the upright portion 2. There are physical elements (e.g., pillars 14) that may be located in recesses in the upright portion 2 in front of the image to emphasize three-dimensionality. The table 5 is disposed in front of the pillars 14 and the image of the dealer 4 behind the pillars 14. The georama 13 is a physical image or construction, and the image of the dealer is originated in a CRT (e.g., 17) lying with the screen horizontal, and the image from the CRT 17 is reflected from a 45 degree mirror 20 for display to the players. This gives the illusion of the dealer being between the table and the georama background. The georama is a physical element, and has no video background at all. The dealer image is a reflected image, not a direct image. The reference appears to describe a distinct dealer image set against a backdrop of a scene.

It must be remembered that the technology of combining video images is standard commercial technology and is relatively old technology from the 1970's. Although many different backing colors may usefully be employed under special conditions, the most commonly selected backing color is substantially pure blue. Therefore, for clarity of description a blue backing will generally be assumed in the present discussion, and the process will ordinarily be referred to by the customary term, "blue screen process." However, any such simplifying assumptions and terminology, are not intended to imply that other colors may not be used, with corresponding modification of the procedure. For example, U.S. Pat. No. 3,595,987, entitled "Electronic Composite Photography" describes apparatus and operations that can be used in creating such combined video images.

U.S. Pat. No. 4,007,487 (Vlahos, Motion Picture Academy of America) describes an improved electronic compositing procedure and apparatus. The process is typically used in the blue screen process and it is suitable for processing motion pictures of professional quality and the like. The invention provides compensation for color impurity in the backing illumination over a continuous range of effective transparencies of the foreground scene. Applicant's previous method for limiting the blue video component for the foreground scene to permit reproduction of light blue foreground objects is improved by a dual limitation criterion which simultaneously suppresses blue flare light from the backing reflected by foreground objects of selected colors, typically including grey scale and flesh tones. The control signal for attenuating the background scene is developed as a difference function predominantly only at areas occupied by opaque or partially transparent foreground objects, and is developed predominantly as a ratio function at unobstructed backing areas, thereby compensating undesired variations in brightness of the backing illumination, while permitting desired shadows on the backing to be reproduced in the composite picture. This is an overlay imaging process for video imaging.

U.S. Pat. No. 4,100,569 (Vlahos) discloses an electronic circuit for combining foreground and background pictures substantially linearly, and included special arrangements for accommodating objects including both blue and magenta colors in the foreground. The system as described merges of foreground and background pictures through a wide range of transparency of the foreground objects. In addition to the normal type of transparent foreground images, including smoke, glasses, and the like, the edges of moving objects are shown as being partially transparent to provide the illusion of rapid movement.

U.S. Pat. No. 4,344,085 (Vlahos, Vlahos-Gottschalk Research) describes a blue screen imaging compositing process using a clean-up circuit that eliminates problems caused by footprints, dust, and dirt on the "blue-screen" floor or other single color backing for the foreground scene, by modifying the basic linear background control signal by using a dual control signal. The normal linear control signal operates over the entire picture in the normal manner. The second control signal is generated by amplifying the linear control signal and inserting it back into the control circuits via a linear OR gate. Thus, any selected level of the background control signal $E_c$ below 100 percent may be raised to 100 percent without influencing the lower levels of $E_c$. At a background control voltage level of perhaps 80 percent or 90 percent of the full background picture intensity, it may be abruptly increased to 100 percent. Above this selected level, any semi-transparency object, (for example the undesired footprint) is made fully transparent and is not reproduced. Further, while the foregoing signals are reduced to zero at this point, the background scene turn-on signal is raised to full intensity levels. This has the interesting collateral effect that thin wires that may be employed to support foreground objects may be rendered invisible, along with the undesired footprints and dust. There is no disclosure of its use for Video Gaming.

U.S. Pat. No. 6,661,425 describes a method for overlapping images in a display. An information input/output device has an intuitive operating feeling and improved information viewing and discriminating properties. The device comprises an superposing image extraction unit extracting a portion for super positional display from an image to output the extracted image portion as an superposing image, a mask pattern generating unit generating a mask pattern, effectors processing the superposing image, and the mask pattern based on the effect designation information, and a base image generating unit synthesizing the mask pattern image and the original image to generate a base image. The device also comprises a switcher, brightness/contrast controllers adjusting the brightness or contrast of the display image switching means, a control unit, super positional image display unit for superposed demonstration of display image planes of the displays and a display position adjustment mechanism. The display information of the image for display in superposition is demonstrated at a position that appears to be floated or recessed from the basic display plane.

U.S. Pat. No. 6,469,747 describes a video signal mixer with a parabolic signal mixing function, especially useful in scene-by-scene color correction systems and "blue screen" video masking applications. The mixer effects mixing two independent signal sources while smoothly controlling the rate of change during mixing. An input stage receives a first video signal and a second video signal. The mixing circuit mixes the first video signal with the second video signal based on a predetermined parabolic function. An aperture signal circuit in the mixer allows a degree of operator control over the parabolic function. An output stage provides a parabolized output signal. The output signal, which comprises the mixture of the first video signal and the second video signal, eliminates discontinuities in regions of the signal which would otherwise produce discontinuities in prior art types of video signal mixers. There is no specific description of the combining of live images on the screen with a preprogrammed image.

All of this background art is incorporated herein by reference in its entirety to provide technical knowledge on how images can be combined and integrated for display in the gaming device imaging system described in the practice of the present invention.

SUMMARY OF THE INVENTION

A gaming system performs the processes of directing and implementing an essentially operator free (automated) table game system at which players sit and interact with a computer driven system. A video feed is provided for display of a virtual dealer activity, and the virtual dealer image can be combined with other background images to provide a unique and more realistic gaming environment. Both live feeds, still background feeds, and animated background feeds can be provided to enhance the image environment. This system provides, for the first time in a gaming environment:

a) video displays of dealers that combine distinct video components;
b) live feeds of background images onto a screen with a virtual dealer display; and/or
c) nested video feed in combination with a mixed video feed.

This gaming system enables an automated gaming system with dealer displays having a theme enhanced by combining a custom background with the dealer video of the TABLE MASTER™ MPP (MULTIPLAYER PLATFORM) gaming system. This can be effective in using a multi-composite background to display both a theme and a separate event such as a popular sporting event. An alternative background can simulate a casino environment by providing a live video feed as the background for the dealer display.

DETAILED DESCRIPTION OF THE INVENTION

Figure 1:
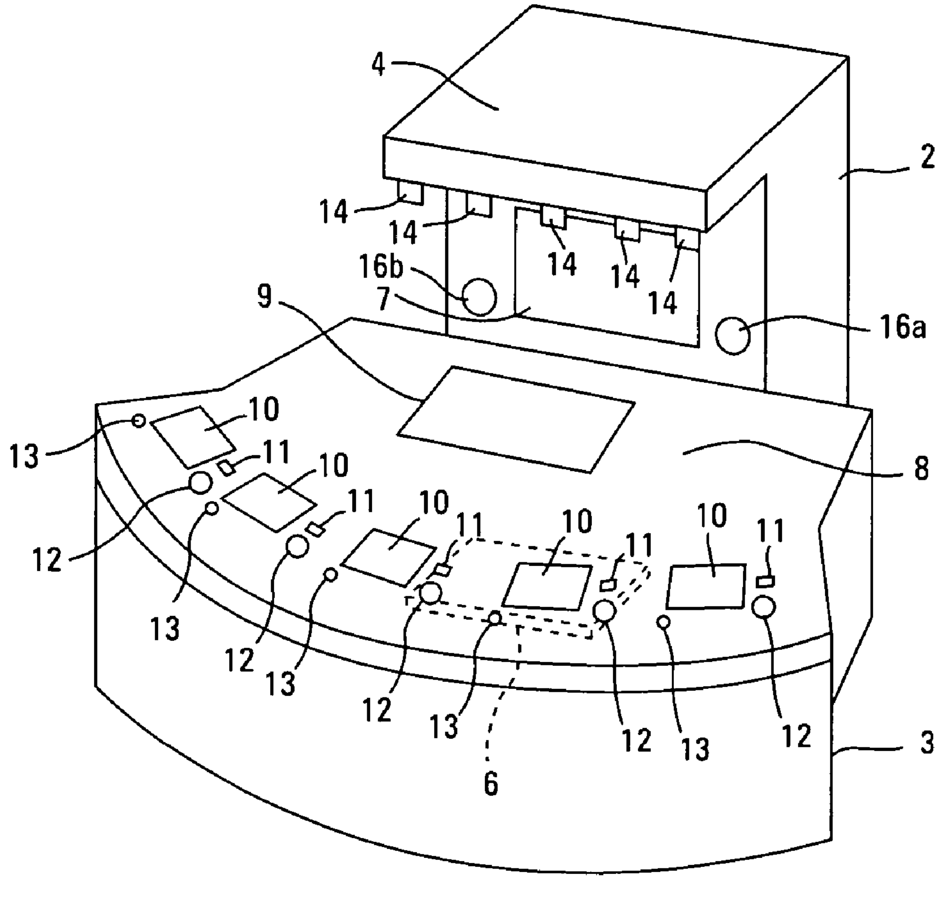
Fig. 1 Prior Art
FIG. 1 shows a perspective view of a prior art format for an automated gaming system.

It should be first understood that in the description of the practices, methods, components, subcomponents and apparatus of the present invention, the examples and specific materials identified are merely exemplary and are not intended to be taken as limits in the practice of the invention. For example, any computer language may be used, any operating system may be used, any commercial or specially designed hardware that can perform the identified functions and provides the described properties can be used, even if the specific component described is or is not a preferred embodiment of the invention.

A fully automated casino table gaming system is provided. A gaming system according to the present invention comprises a table and a dealer "virtual" video display system positioned for view by players seated at the table. The table may seat at least two players up to the amount of players that can be configured about the table and have a view of the dealer video display system. Typically each gaming system will have at least four player positions available, with space determinations considered as to whether there would be 4, 5, 6 or 7 player positions. It is possible to have a completely circular dealer display (e.g., holographic display in a cylindrical centerpiece) and have players distributed around the entire periphery, but this is too dissimilar to standard play arrangements and could slow the game down, as play should approximate that of a live game, with players playing in sequence. A surface of the table will have a generally continuous display surface for showing players' hands (and possibly dealer hands) and, where there are touch screen player controls, for displaying the player touch screen controls. A majority of the table surface comprises a video monitor in one example of the invention. Where there are no touch screen controls, the continuity of the surface may be interrupted by inserted player control panels. The use of a continuous (except for possible interruption by the above indicated panels) display surface offers some significant advantages in simulating or recreating a standard card table surface. Cards may be readily viewed by other players at a blackjack table, which is standard in table games. Individual monitors, especially where slanted towards the individual players make such table-wide card reading difficult. The use of the full screen (continuous) display also allows for better animation to be provided, such as displaying virtual images of cards moving to the player and "virtual" chips being placed on the table when wagers are indicated. For purposes of this disclosure, the term "virtual" means a graphical video representation of a real object or person, such as a dealer, cards and chips, for example.

The individual player positions have a separate intelligence at each player position that accepts player input and communicates directly with a game engine (main game computer or processor). The intelligence is preferably an intelligent board that can process information. For purposes of this disclosure the term "intelligent" refers to the ability to execute code, either provided in the form of software or hardware circuits. Such processing may at least comprise some of signal converting (e.g., signals from player card readers, credit deposit, currency readers, coin readers, touch screen signals, control panel signals) into a signal that can be included in an information packet and interpreted by the main game computer when the signal is sent. Communication between the intelligence at each player position is direct to the main game computer and may be by self-initiated signal sending, sequenced polling by the main game computer (e.g., each position communicates directly to the main game computer in turn), timed communication, or any other order of communication that is direct between the intelligence and the main game computer. There is essentially a single main game computer that contains video display controls and programs for both the dealer display and the table top display, audio controls and programs, game rules (including storage of multiple games if intended to be available on the machine), random number generator, graphic images, game sequence controls, security systems, wager accounting programs, external signaling and audit functions, and the like. In other forms of the invention, the above functions are divided between a main processor and one or more additional processors. The intelligence at each player position speeds up the performance of all aspects of the game by being able to communicate directly with the main game computer and being able to process information at the player position rather than merely forwarding the information in raw form to the main game computer. Processing player information at player positions frees up resources for use by the main processor or processors.

A card game system may also include suitable data and control processing subsystem that is largely contained within a main control module supported beneath the tabletop. The control and data processing subsystem includes a suitable power supply for converting alternating current from the power main as controlled by a main power switch. The power supply transforms the alternating line current to a suitable voltage and to a direct current supply. Power is supplied to a power distribution and sensor/activity electronics control circuit. Commercially available power switching and control circuits may be provided in the form of a circuit board that is detachable and plugs into a board receptacle of a computer motherboard or an expansion slot board receptacle. A main game controller motherboard may include a central microprocessor and related components well known in the industry, such as computers using Intel Corp., Santa Clara, CA, brand PENTIUM® microprocessors and related memory or intelligence from any other manufacturing source. A variety of different configurations and types of memory devices can be connected to the motherboard as is well known in the art. Of particular interest is the inclusion of two flat panel display control boards connected in expansion slots of the motherboard. Display control boards are each capable of controlling the images displayed for the dealer video display and for each of the player position display areas on the continuous display screen on the table and other operational parameters of the video displays used in the gaming system. More specifically, the display control boards are connected to player bet interfaces circuits for the player stations. This arrangement also allows the display control boards to provide necessary image display data to the display electronic drive circuits associated with the dealing event program displays and the dealer display.

The motherboard and/or the player station intelligent boards also include a serial port that allows stored data to be downloaded from the motherboard to a central casino computer or other additional storage device. This allows card game action data to be analyzed in various ways using added detail, or by providing integration with data from multiple tables so that cheating schemes can be identified and eliminated, and player tracking can be maintained. Player performance and/or skill can be tracked at one table or as a compilation from gaming at multiple tables, as by using BLOODHOUND™ security software marketed by Shuffle Master, Inc., which may be incorporated into this automated gaming system. Additionally, player hand analysis can be performed. The motherboard and/or player station intelligent board may also have a keyboard connection port that can be used to connect a larger format keyboard to the system to facilitate programming and servicing of the system.

Although the preferred system shown does not require features illustrated for receiving automated player identification information, such features can alternatively be provided. Card readers such as used with credit cards, or other identification code reading devices can be added to the system (at the location of the motherboard and/or the player station intelligent boards) to allow or require player identification in connection with play of the card game and associated recording of game action by the processor. Such a user identification interface can be implemented in the form of a variety of magnetic card readers commercially available for reading a user-specific identification information. The user-specific information can be provided on specially constructed magnetic cards issued by a casino, or magnetically coded credit cards or debit cards frequently used with national credit organizations such as VISA®, MASTERCARD®, AMERICAN EXPRESS®, casino player card registry, banks and other institutions.

Alternatively, it is possible to use so-called smart cards to provide added processing or data storage functions in addition to mere identification data. For example, the user identification could include coding for available credit amounts purchased from a casino. As further example, the identification card or other user-specific instrument may include specially coded data indicating security information such as would allow accessing or identifying stored security information which must be confirmed by the user after scanning the user identification card through a card reader. Such security information might include such things as file access numbers which allow the central processor to access a stored security clearance code which the user must indicate using input options provided on displays using touch screen displays. A still further possibility is to have participant identification using a fingerprint image, eye blood vessel image reader, or other suitable biological information to confirm identity of the user that can be built into the table. Still further it is possible to provide such participant identification information by having the pit personnel manually code in the information in response to the player indicating his or her code name or real name. Such additional identification could also be used to confirm credit use of a smart card or transponder. All or part of the functions dedicated to a particular player station are controlled by the player station intelligence in one form of the invention. Additionally, each player station intelligence may be in communication with a casino accounting system.

It should also be understood that the continuous screen can alternatively be provided with suitable display cowlings or covers that can be used to shield display of card images from viewing by anyone other than the player in games where that is desirable. This shielding can also be effected by having light-orientation elements in the panel, and some of these light-orientation elements are electronically controllable. In this manner, the processor can allow general viewing of cards in games where that is desirable or tolerated, and then alter the screen where desired. These types of features can be provided by nanometer, micrometer or other small particulate or flake elements within a panel on the viewing area that are reoriented by signals from the processor. Alternatively, liquid crystal or photochromic displays can be used to create a screening effect that would allow only viewers at specific angles of view from the screen area to view the images of cards. Such an alternative construction may be desired in systems designed for card games different from blackjack, where some or all of the player or dealer cards are not presented for viewing by other participants or onlookers. Such display covers or cowlings can be in various shapes and configurations as needed to prevent viewing access. It may alternatively be acceptable to use a player-controlled switch that allows the display to be momentarily viewed and then turned off. The display can be shielded using a cover or merely by using the player's hands. Still further it is possible to use a touch screen display that would be controlled by touch to turn on and turn off. Similar shielding can be used to prevent others from viewing the display.

A review of the figures will assist in a further understanding of the invention.

Figure 2:
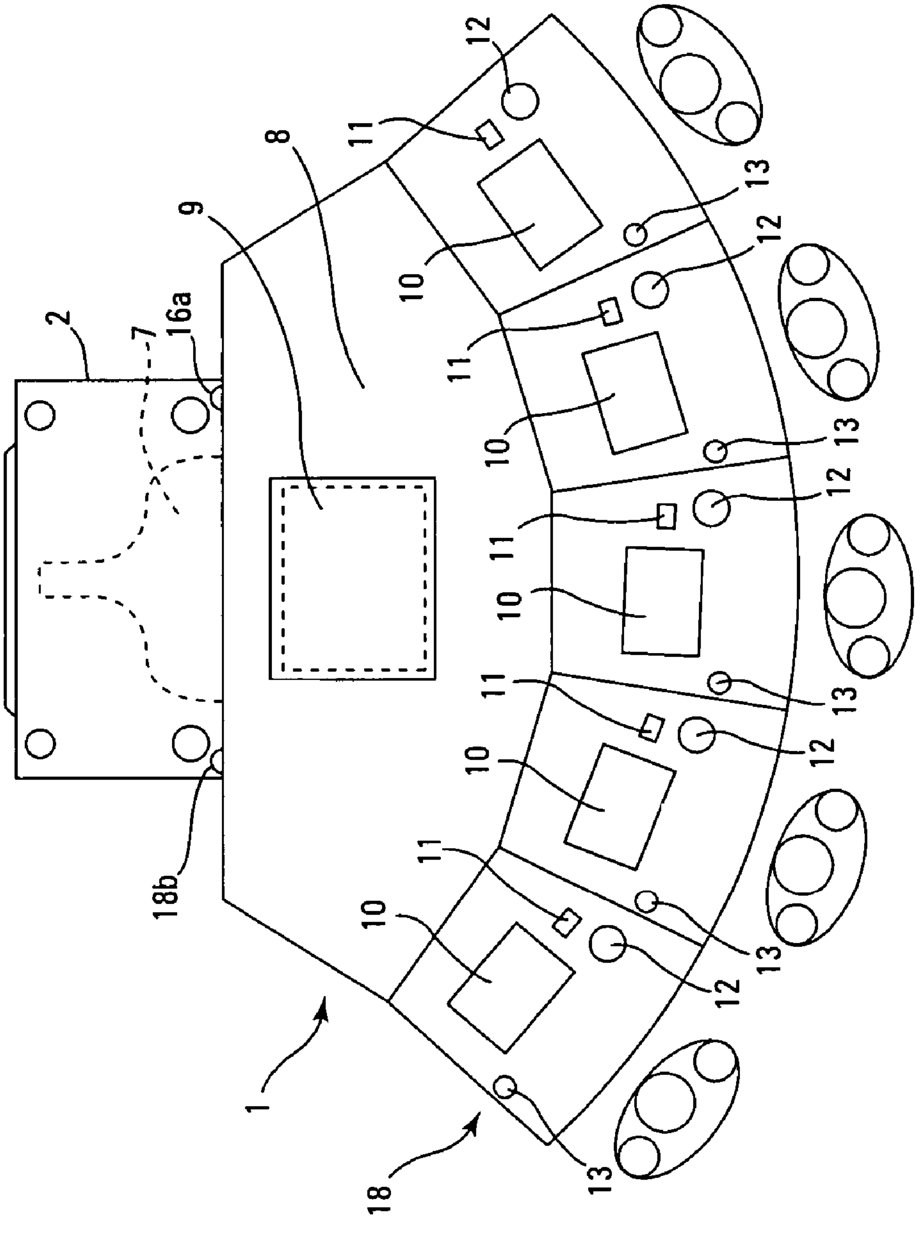
Fig. 2 Prior Art
FIG. 2 shows a top plan view of a prior art format for an automated gaming system.
Figure 3:
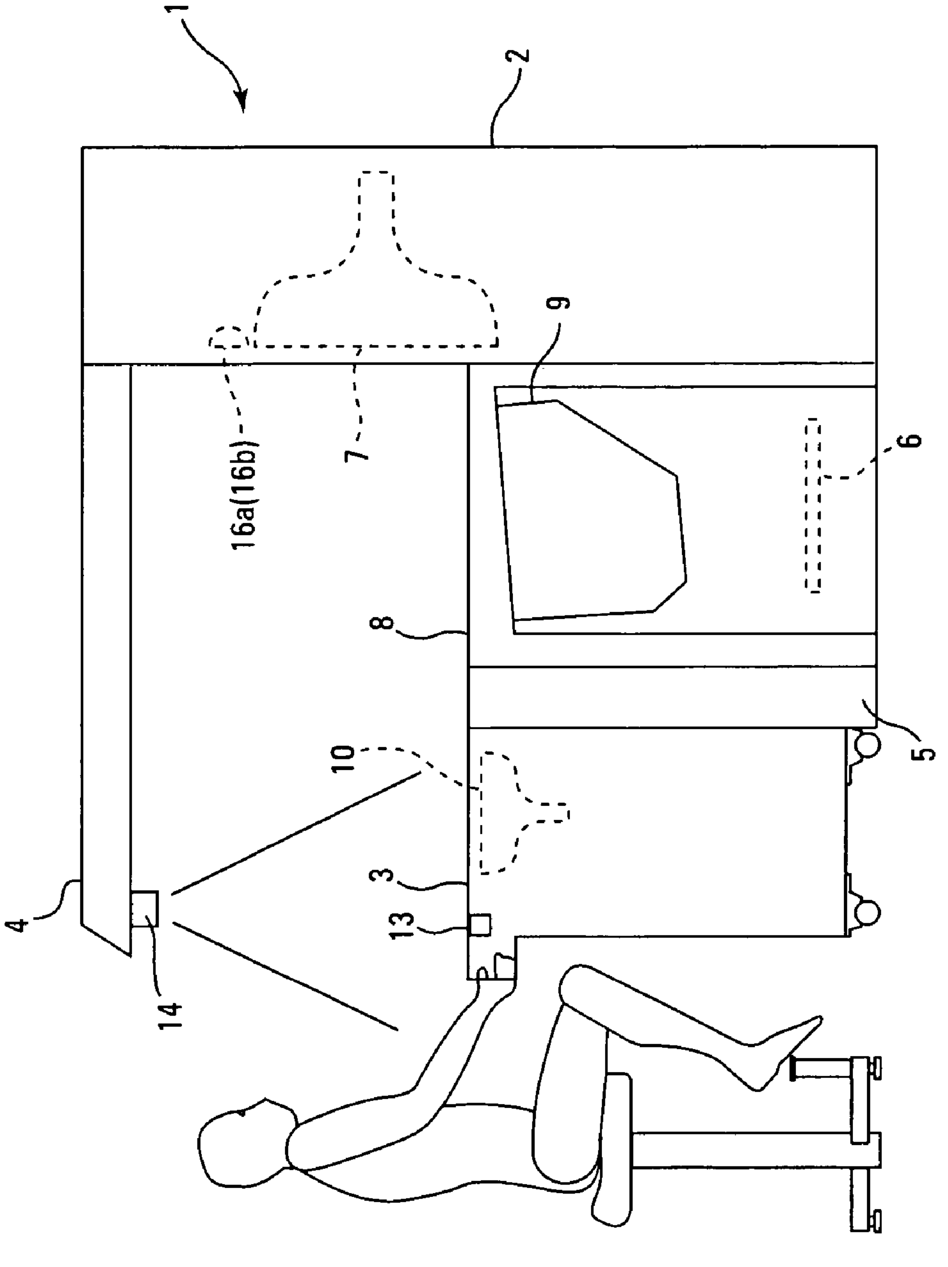
Fig. 3 Prior Art
FIG. 3 shows a side elevational view of a prior art format for an automated gaming system.

FIG. 1 shows a fully automated gaming table 1 of the prior art, as disclosed in U.S. Pat. No. 7,128,651. Automated gaming table 1 comprises a vertical upright display cabinet 2 and a player bank or station cluster arrangement 3. The vertical display cabinet 2 has a viewing screen 7 on which images of the virtual dealer are displayed. The top 8 of the player bank arrangement 3 has individual monitor screens 10 for each player position, as well as tabletop inserted coin acceptors 11, and player controls 12 and 13. There is a separate and larger dealer's hand screen 9 on which dealer cards are displayed in a format large enough for all players to view. Speakers 16*a* and 16*b* (erroneously identified by reference numeral 18*b*) are provided for sound transmission and decorative lights 14 are provided. FIG. 2 shows an overhead view of the same prior art system automated gaming table 1 with the viewing screen 7, as shown by dashed lines, shown more clearly as a CRT (cathode ray tube) monitor. It can also be seen that each player position has to form an arc cut into the semicircular player seating area 18. FIG. 3 shows a side view of the same prior art automated gaming system of FIGS. 1 and 2 where the orientation of the three different types of CRT monitor screens 7, 9 and 10 are shown.

Figure 4:
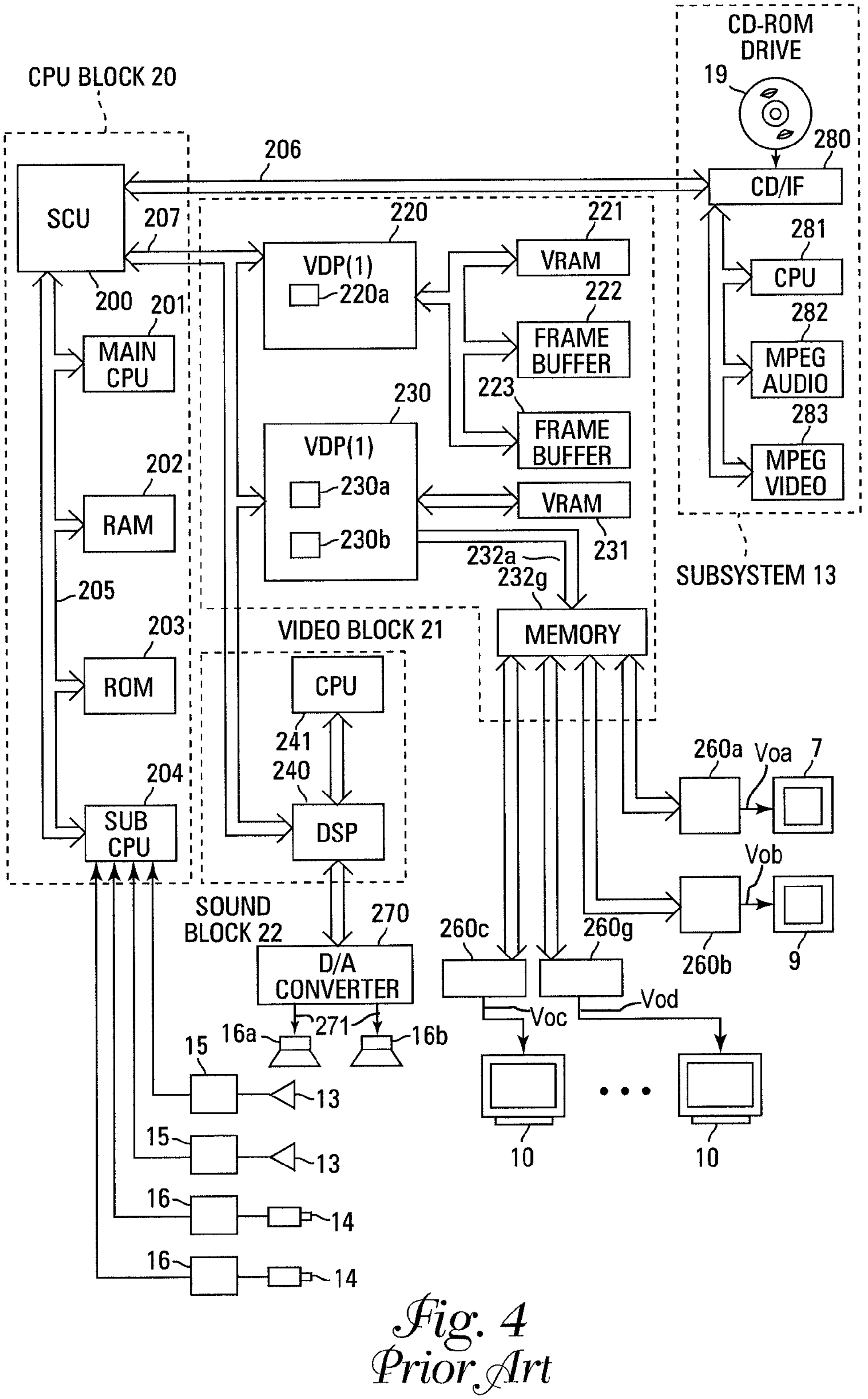
Fig. 4 Prior Art
FIG. 4 shows a block schematic of the electronic configuration of a prior art animated gaming system.

FIG. 4 shows the schematic circuitry of a prior art automated system as disclosed in U.S. Pat. No. 7,128,651. FIG. 4 is a block diagram of processing circuitry in the automated gaming table 1 of FIG. 1. The processing circuitry comprises a CPU (Central Processing Unit) block 20 for controlling the whole system, a video block 21 for controlling the game screen display, a sound block 22 for producing sound effects and the like, and a subsystem for reading out CD-ROM.

The CPU block 20 comprises an SCU (System Control Unit) 200, a main CPU 201, RAM (Random Access Memory) 202, RAM 203, a sub-CPU 204, and a bus 205. The main CPU 201 contains a math function similar to a DSP (Digital Signal Processing) so that application software can be executed rapidly.

The RAM 202 is used as the work area for the main CPU 201. The RAM 203 stores an initialization program used for the initialization process. The SCU 200 controls the buses 205, 206 and 207 so that data can be exchanged smoothly among VDPs (video display processors) 220 and 230, a DSP 240, and other components.

The SCU 200 contains a DMA (Direct Memory Access) controller, allowing data (polygon data) for character(s) in the game to be transferred to the VRAM in the video block 21. This allows the game machine or other application software to be executed rapidly. The sub-CPU 204 is termed an SMPC (System Manager and Peripheral Control). Its functions include collecting sound recognition signals from the sound recognition circuit 15 or image recognition signals from the image recognition circuit 16 in response to requests from the main CPU 201. On the basis of sound recognition signals or image recognition signals provided by the sub-CPU 204, the main CPU 201 controls changes in the expression of the character(s) appearing on the game screen, or performs image control pertaining to game development, for example. The video block 21 comprises a first VDP (Video Display Processor) 220 for rendering TV game polygon data characters and polygon screens overlaid on the background image, and a second VDP 230 (erroneously identified "VDP(1)" instead of "VDP(2)") for rendering scrolling background screens, performing image synthesis of polygon image data and scrolling image data based on priority (image priority order), performing clipping, and the like. The first VDP 220 houses a system register (identified by reference numeral 220*a* in prior art FIG. 4), and is connected to the VRAM (DRAM) 221 and to two frame buffers 222 and 223. Data for rendering the polygons used to represent TV game characters, and the like, are sent to the first VDP 220 through the main CPU 220, and the rendering data written to the VRAM 221 is rendered in the form of 16- or 8-bit pixels to the rendering frame buffer 222 or 223. The data in the rendered frame buffer 222 or 223 is sent to the second VDP 230 during display mode. In this way, buffers 222 and 223 are used as frame buffers, providing a double buffer design for switching between rendering and display for each individual frame. Regarding information for controlling rendering, the first VDP 220 controls rendering and display in accordance with the instructions established in the system register 220*a* of the first VDP 220 by the main CPU 201 via the SCU 200.

The second VDP 230 houses a register 230*a* and color RAM 230*b*, and is connected to the VRAM 231. The second VDP 230 is connected via the bus 207 to the first VDP 220 and the SCU 200, and is connected to picture output terminals Voa through Vog (sic, should be Vod) through memories 232 *a* through 232 *g* (sic, should be 232*d*) and encoders 260*a* through 260*g*(sic, should be 260*d*). The picture output terminals Voa through Vog (sic, should be Vod) are connected through cables to the display 7 and the satellite displays 10.

Scrolling screen data for the second VDP 230 is defined in the VRAM 231 and the color RAM 230*b* by the CPU 201 through the SCU 200. Information for controlling image display is similarly defined in the second VDP 230. Data defined in the VRAM 231 is read out in accordance with the contents established in the register 230*a* by the second VDP 230, and serves as image data for the scrolling screens that portray the background for the character(s). Image data for each scrolling screen and image data of texture-mapped polygon data sent from the first VDP 220 is assigned display priority (priority) in accordance with the settings in the register 230*a*, and the final image screen data is synthesized.

Where the display image data is in palette format, the second VDP 230 reads out the color data defined in the color RAM 230*b* in accordance with the values thereof, and produces the display color data. Color data is produced for each display 7 and 9 and for each satellite display 10. Where display image data is in RGB format, the display image data is used "as-is" as display color data. The display color data is temporarily stored in memories 232*a*-232*f* (sic, should be 232) and is then output to the encoders 260*a*-260*f*(sic, should be 260*a*-260*d*). The encoders 260*a*-260*f* (sic, should be 260*a*-260*d*) produce picture signals by adding synchronizing signals to the image data, which is then sent via the picture output terminals Voa through Vog (sic, should be Vod) to the display 7 and the satellite displays 10. In this way, the images required to conduct an interactive game are displayed on the screens of the display 7 and the satellite displays 10.

The sound block 22 comprises a DSP 240 for performing sound synthesis using PCM format or FM format, and a CPU 241 for controlling the DSP 240. Sound data generated by the DSP 240 is converted into two-channel sound signals by a D/A converter 270 and is then presented to audio output terminals Ao via interface 271. These audio output terminals are connected to the input terminals of an audio amplification circuit. Thus, the sound signals presented to the audio output terminals Ao are input to the audio amplification circuit (not shown). Sound signals amplified by the audio amplification circuit drive the speakers 16*a* and 16*b*(erroneously identified by reference numeral 18*b* in FIG. 2). The subsystem 13 comprises a CD-ROM drive 19, a CD-I/F 280, a CPU 281, an MPEG-AUDIO section 282, and an MPEG-VIDEO section 283. The subsystem 13 has the function of reading application software provided in the form of a CD-ROM and reproducing the animation. The CD-ROM drive 19 reads out data from CD-ROM. The CPU 281 controls the CD-ROM drive 19 and performs error correction on the data read out by it. Data read from the CD-ROM is sent via the CD-I/F 280, bus 206, and SCU 200 to the main CPU 201 that uses it as the application software. The MPEG-AUDIO section 282 and the MPEG-VIDEO section 283 are used to expand data that has been compressed in MPEG (Motion Picture Expert Group) format. By using the MPEG-AUDIO section 282 and the MPEG-VIDEO section 283 to expand data that has been compressed in MPEG format, it is possible to reproduce motion pictures. It should be noted herein that there are distinct processors for the CPU block, video block, sound block, CD-ROM drive and Memory with their independent PCUs. This requires significant computing power and yet still has "dumb" (no intelligence) player input components.

Figure 5:
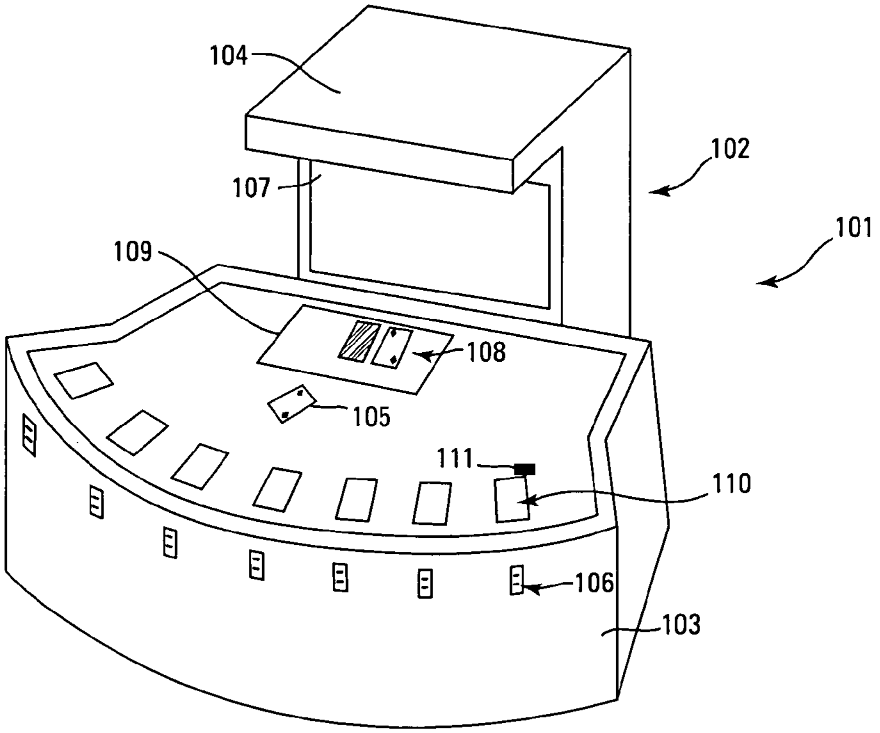
FIG. 5. shows a perspective view of a format for an automated gaming system according to the present invention.

FIG. 5 shows perspective view of an example of an automated table system 101 of the present invention. The system 101 has an upright dealer display cabinet 102 with a top 104 and the dealer viewing screen 107, which may be any form of display screen such as a CRT, plasma screen, liquid crystal screen, LED screen or the like. The player bank arrangement 103 has a continuous display screen 109 on which images of cards 105 being dealt, dealer's cards 108, bets wagered 111 and touch screen player input functions 110 are displayed. Other player input functions may be provided on a panel 106 that might accept currency, coins, tokens, identification cards, player tracking cards, ticket in/ticket out acceptance, and the like.

Figure 6:
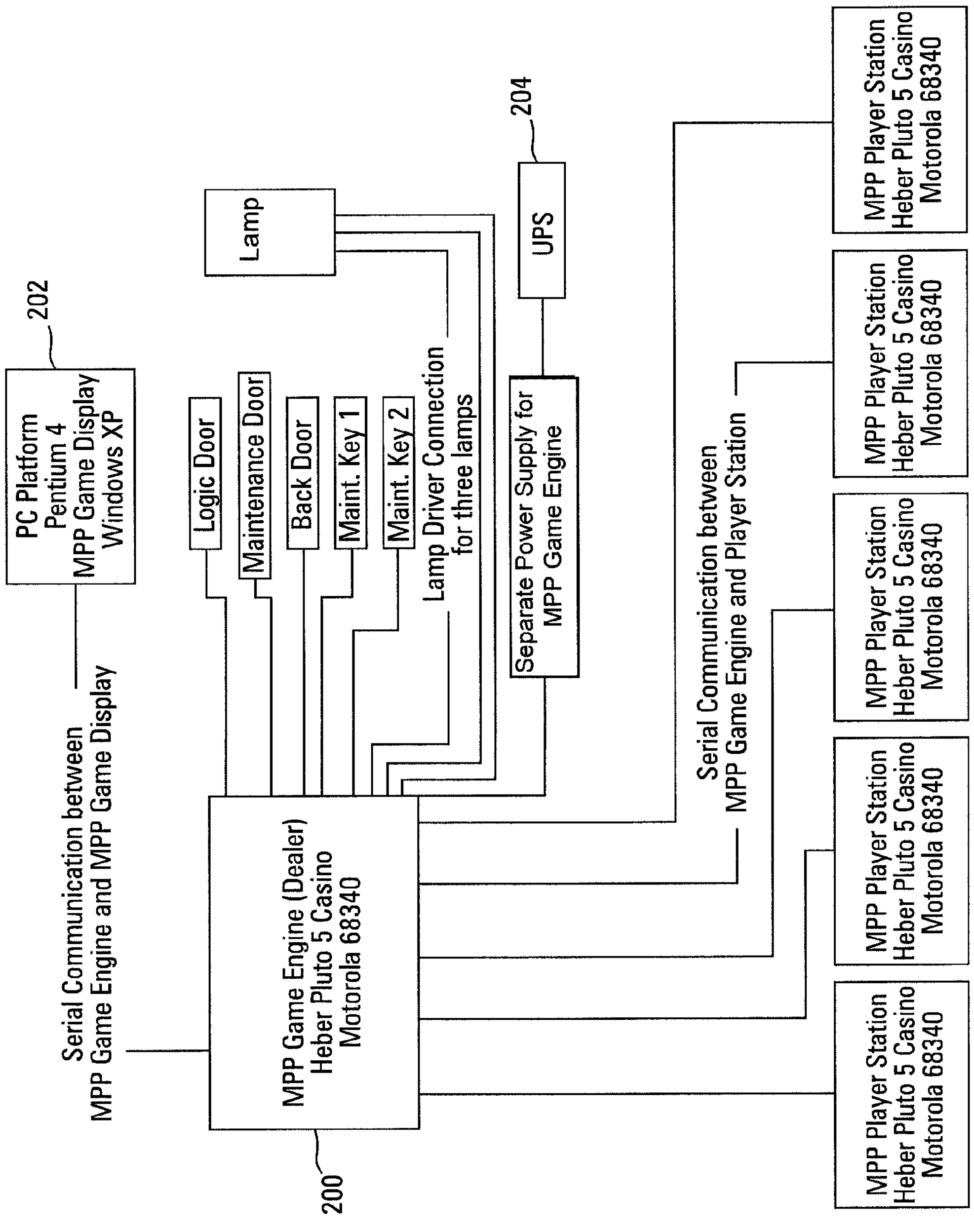
FIG. 6 shows a schematic of a main program of a gaming engine useful in the practice of the present invention.

FIG. 6 shows an electronic/processor schematic for a MultiPlayer Platform (MPP) gaming system according to the present invention. The MPP Game engine (dealer) comprises a Heber Pluto 5 casino game board 200 (Motorola 68340 board) operating off the PC Platform PENTIUM® 4 MPP game display processor 202. The game display processor 202 also operates on a WINDOWS® XP platform. The respective subcomponents on the PENTIUM® 4 processor are labeled to show the apportionment of activity on the motherboard and the component parts added to the board. As is shown, the game engine has an uninterruptible power supply 204. The game display processor directs activity on the Speakers, directs activities onto the MPP game service panel, and the plasma monitor card table display. It is important to note that all communications are direct from the game display processor, freeing up resources available to the game engine processor.

Figure 7:
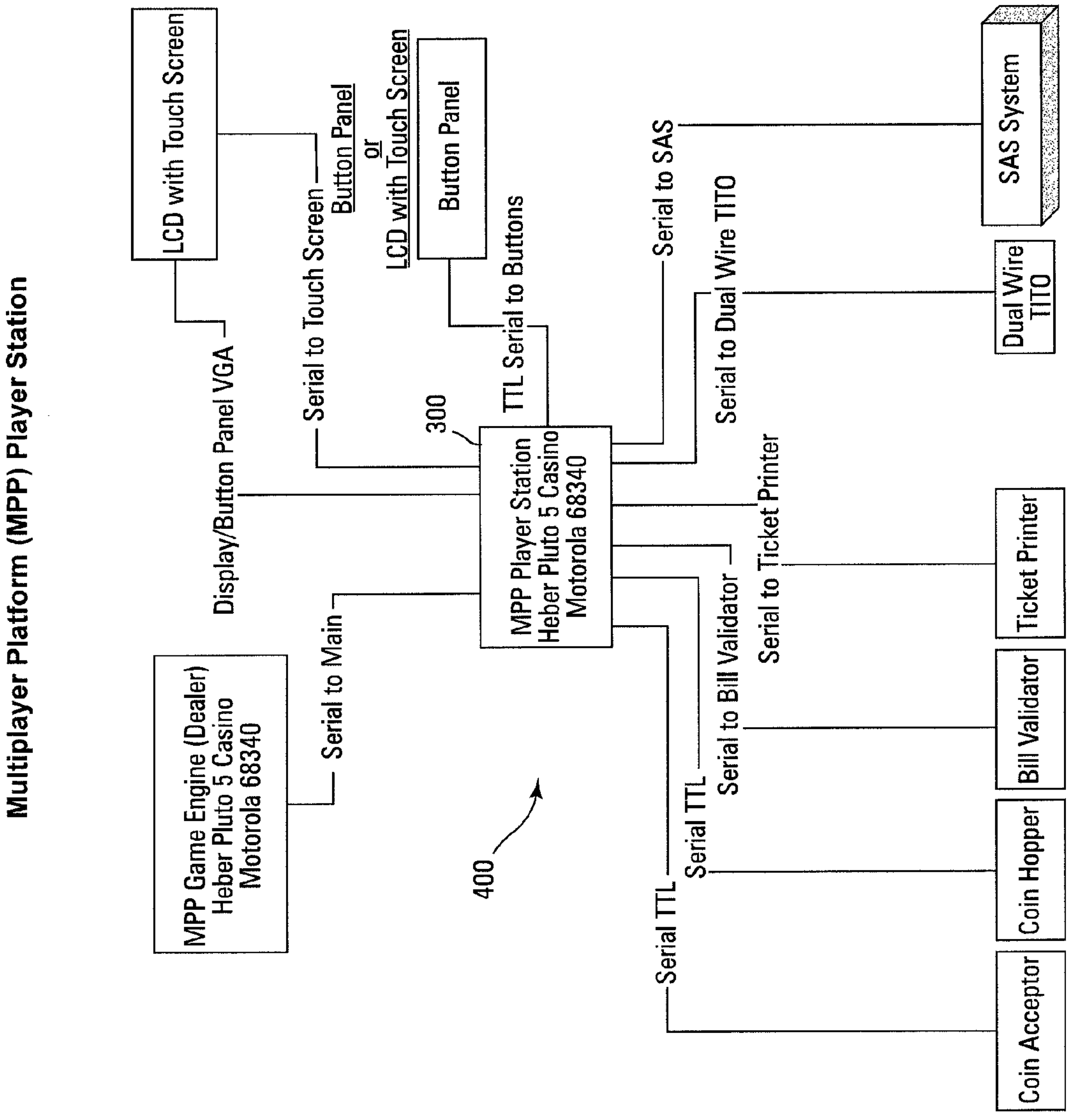
FIG. 7 shows a schematic of a player station useful in the practice of the present invention.

FIG. 7 shows the electronic/processing schematics of the MPP Player Station Intelligence board (Heber Pluto 5 Casino, Motorola 68340), each of which player stations (one for each player position) is in direct connection to the MPP Game Engine (Dealer), which is in turn directly connected to the PC Platform. (not shown in this Figure). Each Intelligence board receives information for all player input systems specific to that player station, such as the shown Coin Acceptor, Coin Hopper, Bill validator, Ticket Printer, Touch Screen and/or Display Button Panel, Dual Wire Ticket-in-Ticket-Out Printing and SAS System (SAS is one exemplary standard communications protocol used by a number of casinos central computer systems.) A significant benefit resides in the use of the independent Intelligence boards at each player position being in direct communication with the MPP Game Engine 300, as opposed to each individual player position button panel being dead or inactive until authorized by the main game processor, as previous automated gaming systems were constructed.

The present invention is also an improvement in providing a system with not only the intelligence at each player position, but also in redistributing processing capability for functions among various processing components within the gaming system. In one architectural format, all functions of the gaming engine, except for the player localized intelligence functions, are consolidated into a single PC (e.g., the PENTIUM® 4 shown in the figures). This would include all game functions, player video functions, dealer video functions, dealer audio functions, security, central reporting (to a casino's central computer, for example), currency and debit functions, alarm functions, lighting functions, and all other peripherals on the system, except for the localized player functions. In this system, the main game processor would talk directly with the player intelligent boards, preferably in the same novel communication format described below.

In another preferred form of the invention, all central reporting and/or communications functions take place between a host computer and the player station intelligent boards.

Figure 8:
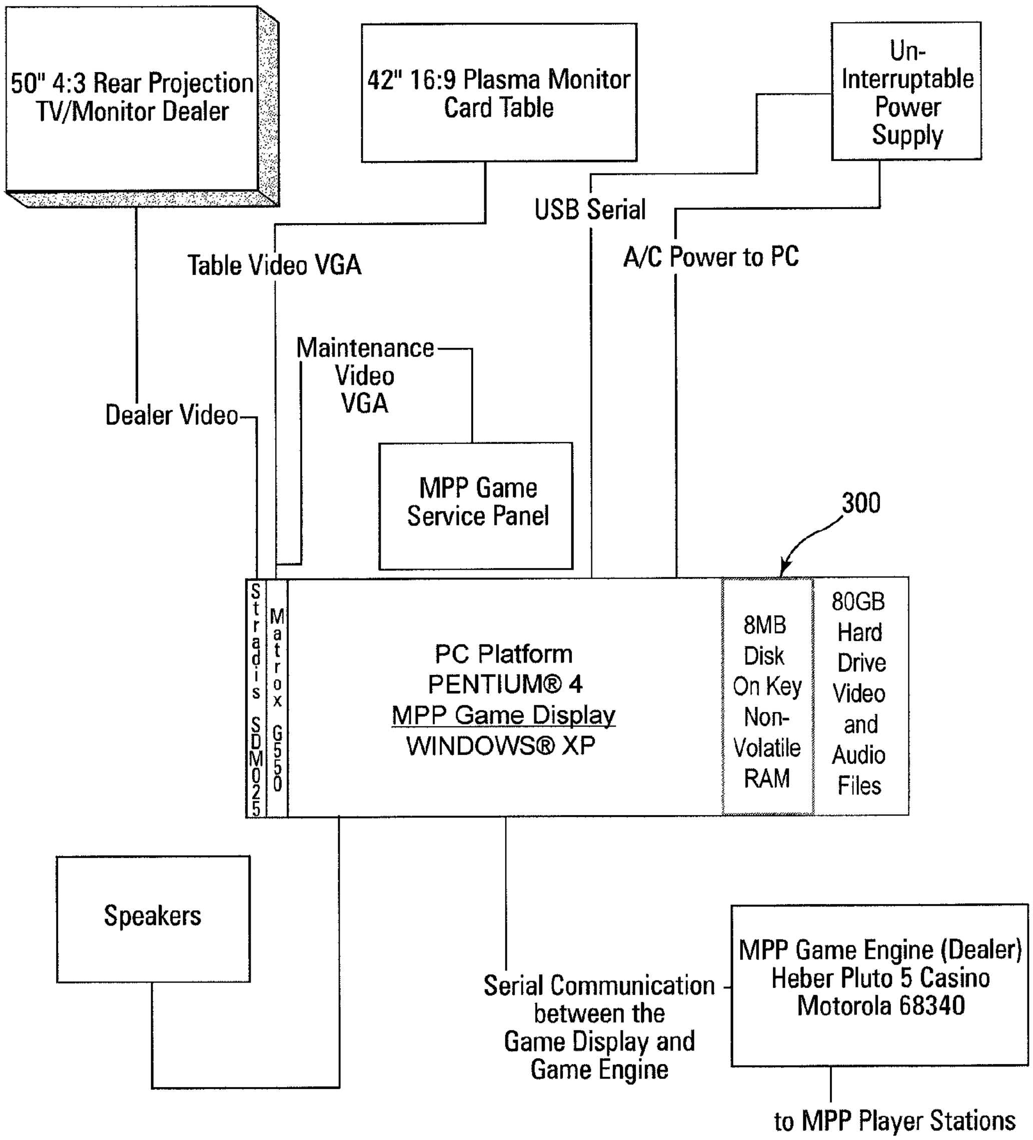
FIG. 8 shows a schematic of a preferred embodiment of a game display useful in the practice of the present invention.

An alternative system is shown in FIGS. 6, 7 and 8, where there is a dealer engine processor intermediate the game display PC and the player intelligent boards. Both systems are a distinct improvement over the prior art, but with the higher power available for PCs, and with the ease of programming a PC as opposed to an embedded system, the consolidation of the game functions and the ability of the main game engine to communicate with each of the player positions is enabled. As shown in FIG. 8, the game display processor 300 is preferably a PENTIUM® 4 PC and is separate from the main (dealer) processor. With the player intelligent boards, the main game PC can receive packets of information from each player station as events occur rather than having to poll each player position on a regular basis 100 times to gain the specific information for each player input that may be made.

A description of the Heber Board, (an exemplary board that can be used as a player station processor and/or game engine processor a commercially available intelligent processing board is as follows. The Heber Board is known for its reliability and flexibility, especially for the Pluto 5 family of gaming products. The Pluto 5 is the controller of choice for the global gaming industry. Flexibility comes from a set of features built into the Pluto 5 (Casino) controller, and from the choice of optional add-on boards that can be used to adapt the Pluto family to best suit individual applications. In the area of interfacing, there are three distinct boards, each of which serves a particular function in helping the Pluto 5 to connect with the world outside:

RS485 Board

RS485 is an industrial-grade board for linking multiple systems in unforgiving circumstances for centralized information gathering. The Heber RS485 board is fully opto-isolated to provide complete circuit safety when used within 'electrically noisy' environments. The RS485 board uses a single RS232 connection to the Pluto 5 board and all necessary power is also derived through this link. Two header connectors may be provided for the RS485 channel to allow daisy chain connections between multiple systems.

HII/ccTalk Board

This board specializes in communicating with industry standard note/coin acceptors and payout hoppers. Equipped with dual communication channels, each port is configurable to use either the HII format to connect with MARS™ coin/note acceptors or the ccTalk format for MONEY CONTROLS® hoppers. Both channels are controlled via a single RS232 connection to the Pluto 5 board and all necessary power is also derived through this link. The Heber FastTrack package contains modular library functions for passing information via these channels.

Four Channel Relay Board

The relay board allows control of medium- to high-level loads such as solenoids, without risk of damage or interference to the Pluto 5 circuitry. Four power-switching channels are available with absolute isolation from the Pluto 5 control signals. Each relay is capable of switching direct or alternating currents of up to 7 A at a maximum voltage of 250V.

Like the Pluto 5 board itself, its modular options have been used extensively so that their designs are fully developed and entirely stable. The options that are specified are consistently provided in mass quantities. As with all Pluto products, programming for the modular options is straightforward. This is enhanced with the use of the Pluto 5 Enhanced Development Kit and also the FastTrack package. Between them these kits contain all of the low level and high level programming tools and library functions needed for gaming applications. These systems can be provided through a Pluto 5 Enhanced Development Kit datasheet 80-15353-7

Heber Limited, Belvedere Mill, Chalford, Stroud, Gloucestershire, GL6 8NT, UK Tel: +44 (0) 1453 886000 Fax: +44 (0) 1453 885013 www.heber.co.uk Specifications for the various boards are identified below.

RS485 Interface
Host Interface
RS232 connection to Pluto 5/Pluto 5 Casino
All power provided via RS232 link from host system
Communication Port
Dual four-way Molex 0.1" KK headers for daisy chaining purposes
Dimensions
80×61 mm (3.14×2.4")
Part Number
Opto-isolated RS485 board
01-14536-2
HII/ccTalk Interface
Host Interface
RS232 connection to Pluto 5/Pluto 5 Casino
All power provided via RS232 link from host system
Communication Port
Single or dual 10 way header connectors
Dimensions
101.6×69.85 mm (4×2.8")
Part Number
Dual channel HII/ccTalk board
01-16171-2
Four Channel Relay Board
Host Interface
Connection to Pluto 5/Pluto 5 Casino via ribbon cable using four standard output lines
All power provided via ribbon cable link from host system
Switching Capabilities
Up to 250V AC or DC @ 7 A maximum per channel
Dimensions
80×61 mm (3.14×2.4")
Part Number
Four channel relay board
01-15275-1
80-16949-1

One proposed hardware configuration uses a "satellite" intelligent processor at each player position. The player station satellite processor is substantially the same as the primary game engine processor, a Heber Pluto 5 Casino board. The satellite processors receive instruction from the primary game engine but then handle the communications with player station peripherals independently. Each satellite processor communicates with only the peripherals at the same player station. Thus each player station has a dedicated satellite processor communicating with only the peripherals at the same player station and with the casino's central computer system. The peripherals are, but not limited to: Slot accounting Systems, Bill Validator, Ticket Printer, Coin Acceptor, Coin Hopper, Meters, Button panel or LCD touch screen and various doors and keys.

The satellite processors run proprietary software to enable functionality. The player station software is comprised of two modules, the first being an OS similar to the game engine Operating System and the second being station software that handles peripheral communications. The software may be installed on EPROM's for each satellite processor. The primary method of communication between the satellite processors and the primary game engine is via serial connectivity and the previously described protocol. In one example, information packets are prepared by the satellite processors and are sent to the game engine processor on the happening of an event.

The proposed game engine provides communication to the player stations to set the game state, activate buttons and receive button and meter information for each player station. Communication is via a serial connection to each of the stations. The new protocol for communication between the game engine, game display and player stations is an event driven packet-for-packet bidirectional protocol with Cyclic Redundancy Check (CRC) verification. This is distinguished from the Sega system that used continuous polling. This communication method frees up resources in the same engine processor because the processor no longer needs to poll the satellites continuously or periodically.

The new protocol uses embedded acknowledgement and sequence checking. The packet-for-packet protocol uses a Command Packet, Response Packet and a Synchronization Packet as illustrated below. The protocol uses standard ASCII characters to send data and a proprietary verification method.

Format of Command Packet

| STX | SEQ | DATA LENGTH | DATA | CRC-16 | ETX |
|---|---|---|---|---|---|
| 1 | 1 | 3 | 3-999 | 5 | 1 |

Format of Response Packet

| STX | SEQ | DSP | PRV | ETX |
|---|---|---|---|---|
| 1 | 1 | 1 | 1 | 1 |

Format of Synchronization Response Packet

| STX | MTS | MRS | ETX |
|---|---|---|---|
| 1 | 1 | 1 | 1 |

Legend For Figures

| | |
|---|---|
| STX | Start of Packet Character |
| SEQ | Sequence # (Cycles from '0' thru '9') |
| LEN | Length of Data Area ('003' thru '999') |
| DATA | ASCII Data Fields Separated with '\|' Character |
| CRC | CRC-16 Value ('0000' thru '65535') Cyclic Redundancy Check |
| ETX | End of Packet Character |

-continued

| Legend For Figures | |
|---|---|
| DSP | Disposition Code ('A' ACK, 'N' NAK, or 'I' Invalid Sequence) |
| PRV | Sequence Number of Last ACK'ed Packet (0 thru 9) |
| MTS | Main's Current Transmit Sequence Number |
| MRS | Main's Current Receive Sequence Number |

The Command Packet and Response Packet are used during primary game communications. The protocol uses redundant acknowledgement. For example: The packet is initially acknowledged when first received by the recipient. The same recipient will resend anther acknowledgement in the next communication. This second acknowledgement is the 'PRV' data in the response packet.

The communications between the Game Engine and the Player Station intelligence is preferably a transaction-based protocol. Either device can start a transaction, which is why it is essential that there be an intelligent board at each player position. All packets of information may be sent in any acceptable format, with ASCII format preferred as a matter of designer choice. All command packets usually contain a sequence number that is incremented after each successful packet exchange. The Game Engine and the Player Station intelligence use sequence numbers that are independent of each other. The sequence number keeps the communications in synchronization. This synchronization method is described later.

The command packet is used to send various commands such as Inputs, Lamps, Doors, Errors, Chirp, Game Results, player input, coin acceptance, player identification, credit acceptance, wagers, etc. . . . The command packet format may be, by ay of a non-limiting example:

<STX><Sequence number><Data Length><Data><CRC-16><ETX>

The data format with in the command packet may be:

<Address><Command><Field 1>|<Field 2>|<Field n>|

The response packet format may be:

<STX><Sequence number><Disposition><Previous ACK><ETX>

The sync request packet format may be:

<SYN>

The sync response packet format may be:

<STX><Mains Current Transmission Sequence><Mains Current Receive Sequence><ETX>

A major strength of the protocol is its resilience of the Game Protocol and its ability to free up resources within the game engine. Those resources can in turn be used to provide more intricate games, and multi-media affects.

Synchronization Method:

The satellite and host must become synchronized in order to provide for reliable communications using packet numbers. To facilitate this, a novel protocol synchronization method that is used. Upon applying power to the satellite, or after a communications failure, the satellite automatically enters into synchronization mode. In the synchronization mode the satellite sends out the ASCII SYN (0x16) character about every second. It is expecting a special response packet containing transmit and receive packet sequence numbers to be used from that point on. After receiving the special response packet, the sequence numbers are used as-is, and not incremented until the a successful packet exchange. After communications is synchronized, the sequence numbers are incremented after each packet is successfully sent or received.

As was noted before, the main game processor may contain information, data, programming and other necessary functions to enable the play of multiple games off the same machine. For example, the main game engine may have rules and commands that will enable play of blackjack, LET IT RIDE® stud poker, THREE-CARD POKER®, FOUR-CARD POKER™, Caribbean stud poker, Spanish 21 blackjack, baccarat, pai gow poker, and other card games. The system may also be configured so that different games may be played at different times on command of the casino or players.

Figure 9:
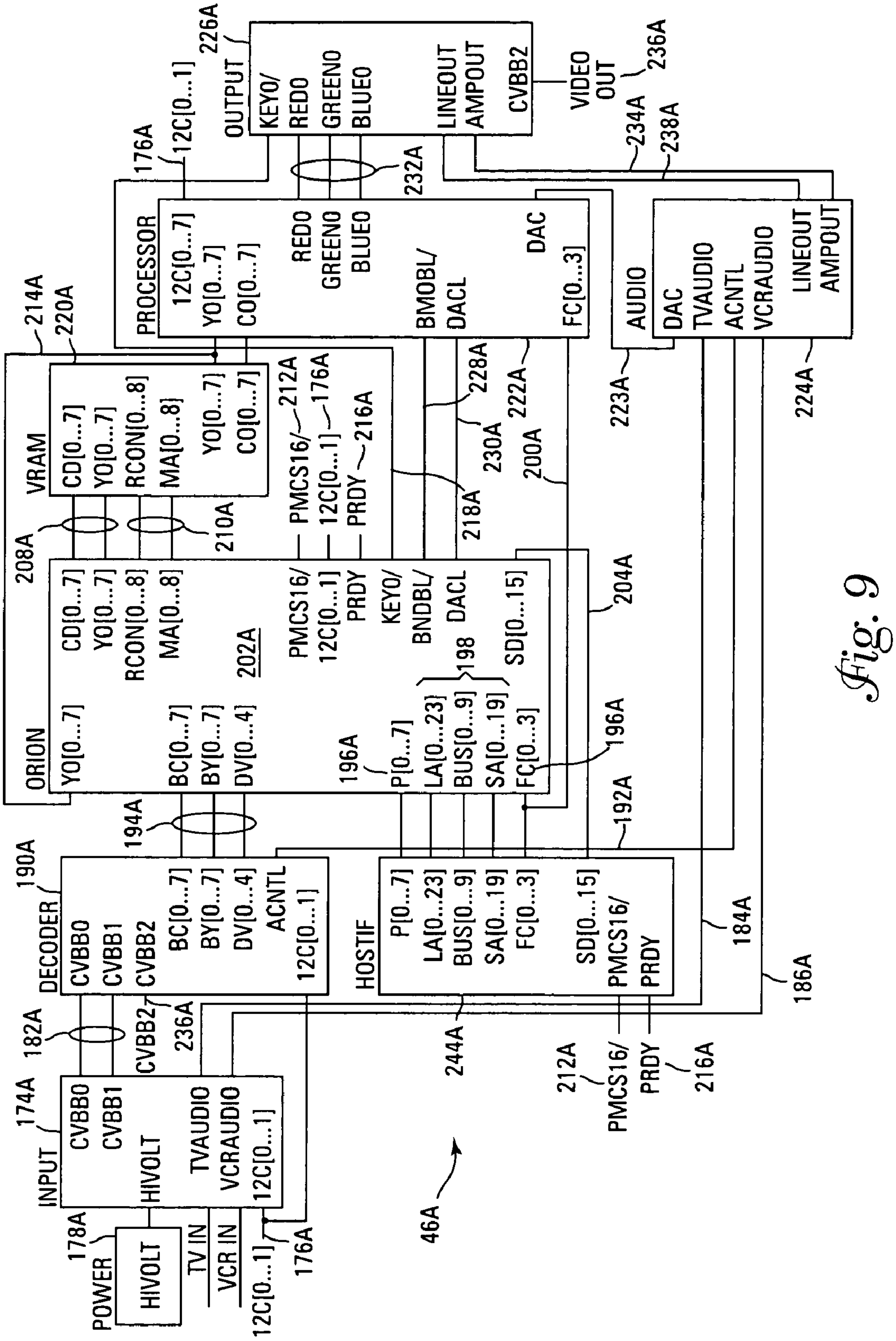
FIG. 9 shows a first schematic diagram of a video feed and processing system that can be used to compose blended images in the practice of the present invention.

FIG. 9 provides a block diagram of television circuit 46A of a preferred embodiment of the present invention. Input circuit 174A includes a cable-ready TV tuner circuit and an input from an external video source. Input circuit 174A is powered by an independent high voltage circuit 178A. Input circuit 174A is connected to decoder 190A and Orion 202A via $I^2C$™ bus 176A. The $I^2C$™ bus 176A provides for programmed control of the major components of television circuit 46A. In particular, in the input circuit 174A, it provides for channel selection of the tuner circuit. The $I^2C$™ bus is a patented bus structure owned by Philips Electronics, Andover, MA.

Coming from input circuit 174A are CVBBO and CVBB1 signals 182A, TV audio signal 184A and VCR audio signal 186A. The signals on lines 182A for CVBB0 and CVBB1 go to decoder 190A. Output from decoder 190A, includes analog control signal, ANCTL 192A, and decoded video signals 194A. In addition to signals 194A of BC, BY and DV from decoder 190A, P and FC signals 196A, I.sup.2 C® bus 176A, and bus, SA, and LA signals 198A go to Orion 202. FC line 200A also connects to processor 222A. Also, SD line 204A connects to Orion 202A.

Orion 202A provides RCON and MA output signals 210A to VRAM 220A and CD and CY signals 208A to VRAM 220A. PMCS16/signal 212A feeds from Orion 202A into host interface 244A. Also, PRDY signals 216A from Orion 202A goes to host interface 244A. Finally, BNDBL and DACL signals from Orion 202A feed to video processor 222A. Video processor 222A outputs include $I^2C$™, signals to Orion 202A and RED0, GREEN0 and BLUE0 signals 232A to output 226A and DAC signals 223A to audio circuit 224A. Output circuit 226A receives RED0, GREEN0 and BLUE0 signals 232A, KEY0 signals 218A, LINEOUT signals 238A, and AMPOUT signals 234A and transmits video signals 236A to VGA monitor. Audio output circuit 224A receives DAC signals 223A, TVAUDIO signal 184A, analog control signal ACNTL 192A and VCRAUDIO signal 186A to generate LINEOUT signals 238A and AMPOUT signals 234A, as previously stated.

Television circuit 46A is an IBM PC-AT compatible single slot add-in circuit that is placed on an add-in card that integrates full motion video and audio with a personal computer (not shown). The computer is required to have a VGA or SVGA graphics card and analog black and white or color monitor. A user provides a video source like an antenna or VCR to the card that transforms the incoming video signals onto monitor display (not shown), mixing the new video with the traditional PC display.

Attributes of the input image such as channel, image size, cropping, color, contrast, and volume are varied via the computer through the user interface programs. TV circuit 46A, in addition to providing live video, is a high-resolution true-color still image display and capture card. Vivid still images may be displayed on the video monitor, mixed with video signals from host computer, and saved to a disk for less cost than with known circuitry. This feature makes applications such as teleconferencing over a local area network possible. Television circuit 46A provides a user accessibility to live video and high quality still images through an easy to use computer interface.

Hardware of television circuit 46A is configured to run under DOS, or a graphical user interface software package, such as WINDOWS® 3.0 or Multimedia WINDOWS®. Possible uses for television circuit 46A include, video tape training, interactive software with video laser disk connection, sales kiosks, full-speed teleconferencing using dedicated cabling, and reduced frame rate video phone conferencing over a local area network. Additionally, uses such as security monitoring, in-office reception of presentations and classes and television news, financial network monitoring, and entertainment are also possible using television circuit 46A in a preferred embodiment of the present invention.

The motion video signal may be of two formats: baseband NTSC and RF modulated NTSC. In other words, the user may plug in a VCR, camcorder, laser videodisk player, antenna, cable TV or any signal compatible with these. There is also an audio input that would come from a VCR type device. The host computer video from a VGA circuit may also be input to television circuit 46A, as well as internal digital color information from a host computer graphic card. The mixed video is output to an analog monitor, such as VGA monitor. In the preferred invention, audio is fed through an audio multimedia circuit and output to chassis speakers. Television circuit 46A may also be used independently with an onboard amplifier that outputs to a speaker. Digital still image data may be loaded into television circuit 46A from the host computer. This data may be a picture from a multimedia application and may come from an electronic mail or local area network.

Also, in association with television circuit 46A of the present invention may be circuitry for full speed teleconferencing of telephone signals and video images using a dedicated cable network. A video telephone circuit may also be supported using the combination of television circuit 46A and data/fax/voice modem circuit (not shown) over a local area network.

Figure 10:
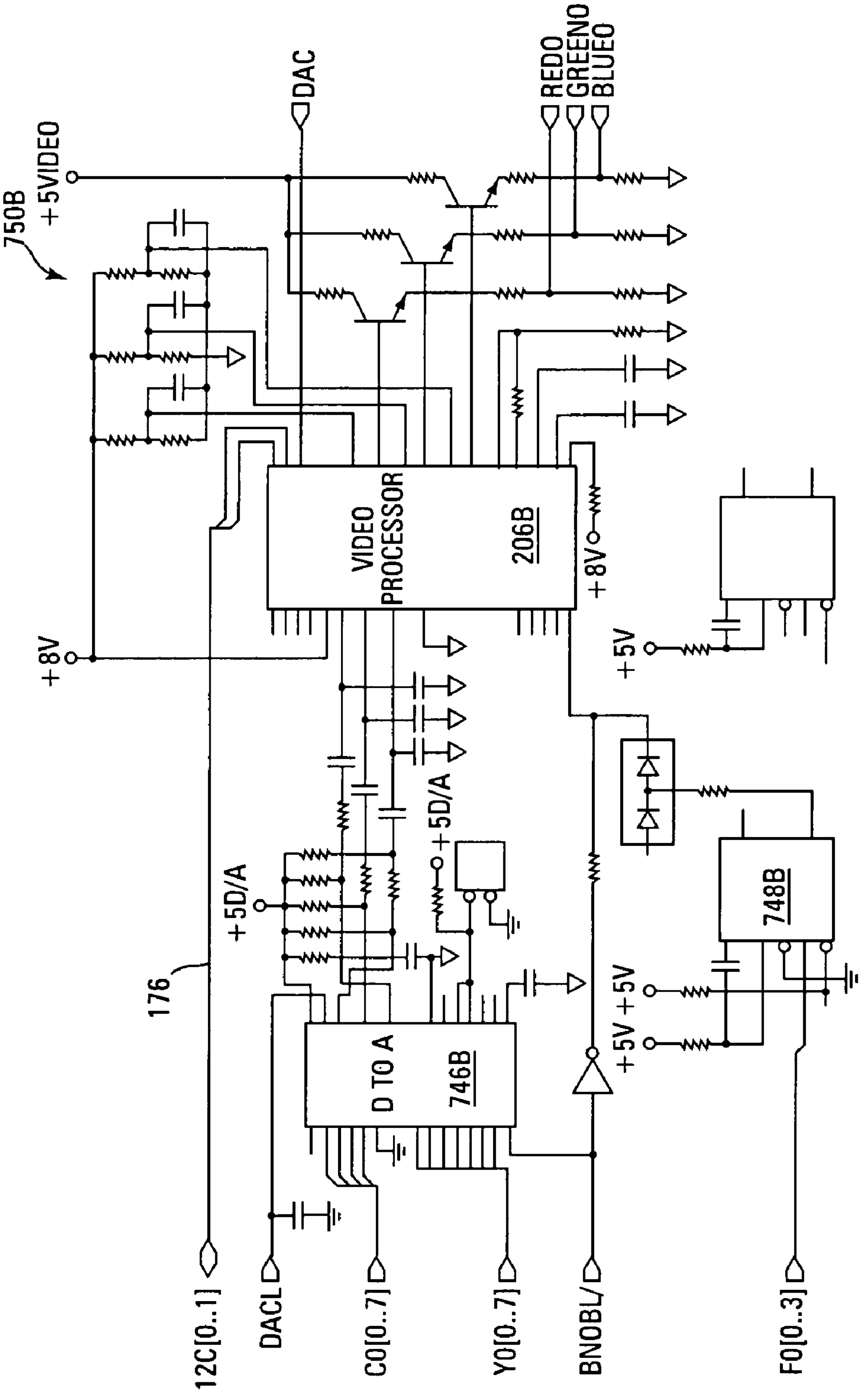
FIG. 10 shows a second schematic diagram of a video feed and processing system that can be used to compose blended images in the practice of the present invention.

FIG. 10 provides a detailed schematic diagram of a digital-to-analog converter 746B and video processor 206B of a preferred embodiment of the present invention. Digital-to-analog converter 746B and video processor 206B, manufactured by Phillips, convert the digital video from VRAM circuit 220A (in FIG. 9) into Y:U:V analog data. In association with D/A converter 746B is "1-shot" chip 74LS123 748B. The "1-shot" chip 748B is a recommended part to be used with Orion 202A and provides a pulse in response to a received signal from the Orion. Output from "1-shot" 748B goes to video processor 206B as an analog step voltage signal. This provides a sandcastle signal for use in recreating an analog signal from the digitized input. Video processor 206B is the Phillips part TDA4680 along with pull down resistor and capacitor circuitry 750B. Pull down resistor and capacitor circuitry 750B is added to increase the brightness from video processor 206B.

One non-limiting examples of a method for providing the blending or mixing of images comprises a method for displaying the image for demonstration in superposition on the base image explained in detail. First, the case of extracting the image for demonstration in superposition from the original image is explained.

For emphasizing a specified area in the original image, the specified area is extracted and demonstrated in superposition so that the area appears as if it is floated up or sunk from the base image. To this end, it is necessary to designate which portion in the original image is to be extracted. It is the information for designating the superposing area that specifies this area in the original image. The generation of an superposing image in the superposing image extraction unit is explained.

Assume that the original image is made up of 640.times.480 pixels and the superposing information is 50.times.50 pixels with a specified position in the original image as a base point. An superposing image is obtained by extracting 50.times.50 pixels from the original image followed by overwriting an image of 50.times.50 pixels, as the superposing information, on an image of 640.times.480 pixels as in the original image, with the entire pixels being black pixels with the pixel value of 0, in accordance with a base point which is the same as that of the original image.

The generation of a mask pattern and the synthesis of the mask pattern with the image to be superposed are explained in detail. If the alpha-plane of each pixel is made up of eight bits, the structure of the simplest mask is such an image in which a masked portion (area) is of the alpha-value equal to 0 and the remaining area has a value of 255.

This image may be ANDed (logical multiplication) with respect to the image to be superposed to apply a masking effect to a site corresponding to the superposing image. Each pixel of the image to be superposed, corresponding to the mask pattern, may be multiplied with a coefficient k ($0<k<1$) to decrease the luminosity of the portion in question of the image to be superposed, instead of being processed with the logical product processing.

If the alpha-value of the mask pattern is 0 and the masking by logical product is applied, the processing operation is simple, such that the processing is completed quickly. However, the information of the masked portion of the image for display in superposition is all black such that the information becomes invisible.

If now the mask pattern is formed by a partially masking hatching pattern, such as a checkerboard pattern, and the image for display in superposition is masked, it is possible by simple logical calculations to lower the apparent luminosity without causing loss of the entire information of the image to be superposed by masking.

If a half-mirror is used, and the user directly acts on the display (a) by a manual operation, the user's hand is interposed between the user and the display. However, since the reflected image of the display (b) is not hidden with a hand, there are occasions wherein, even if the hand is at a more recessed position than the reflected image, the superposing image is displayed on the hand. In such case, the shape of the user's own hand, as seen from the user, may be generated as a pattern, and the superposing image may be masked in the effector unit to alleviate the extraneous feeling.

By dynamically changing the image extraction pattern in the superposing image extraction unit or the area of the superposing image, and by correspondingly changing the mask pattern to mask the original image or the reference image, it is possible to switch wiping between the image for display in superposition and the base image. By registering the change as a wipe pattern in the controller module etc. and by designating the registration number, change rate, switching start point or the pattern position, image plane switching can be realized effectively.

In case the image plane sizes of the two displays represented by a terminal unit, differ from each other, the image for display in superposition and the mask pattern are generated in such a manner as to reflect the image plane size ratio so that the image for display in superposition and the mask pattern will appear to be of the same size, should these be displayed respectively.

U.S. Pat. No. 6,466,220 describes a method and apparatus for display of graphical data that is incorporated herein by reference. An architecture is provided for graphics processing. The architecture includes pipelined processing and support for multi-regional graphics. In one embodiment, a graphics driver according to the invention can receive multiple independent streams of graphical data that can be in different graphical formats. The independent streams are synchronized and converted to a common format prior to being processed. In one embodiment, multi-regional graphics are supported with off-screen and on-screen memory regions for processing. The regions of the multi-regional graphic are rendered in an off-screen memory. The data in the off-screen memory are converted to a common format and copied to on-screen memory. The data in the on-screen memory is used to generate an output image. Alpha blending can also be programmed to provide multi-regional graphics or other graphical features. In one embodiment, graphics processing is programmable and can be paced using a set of registers.

Figure 11:
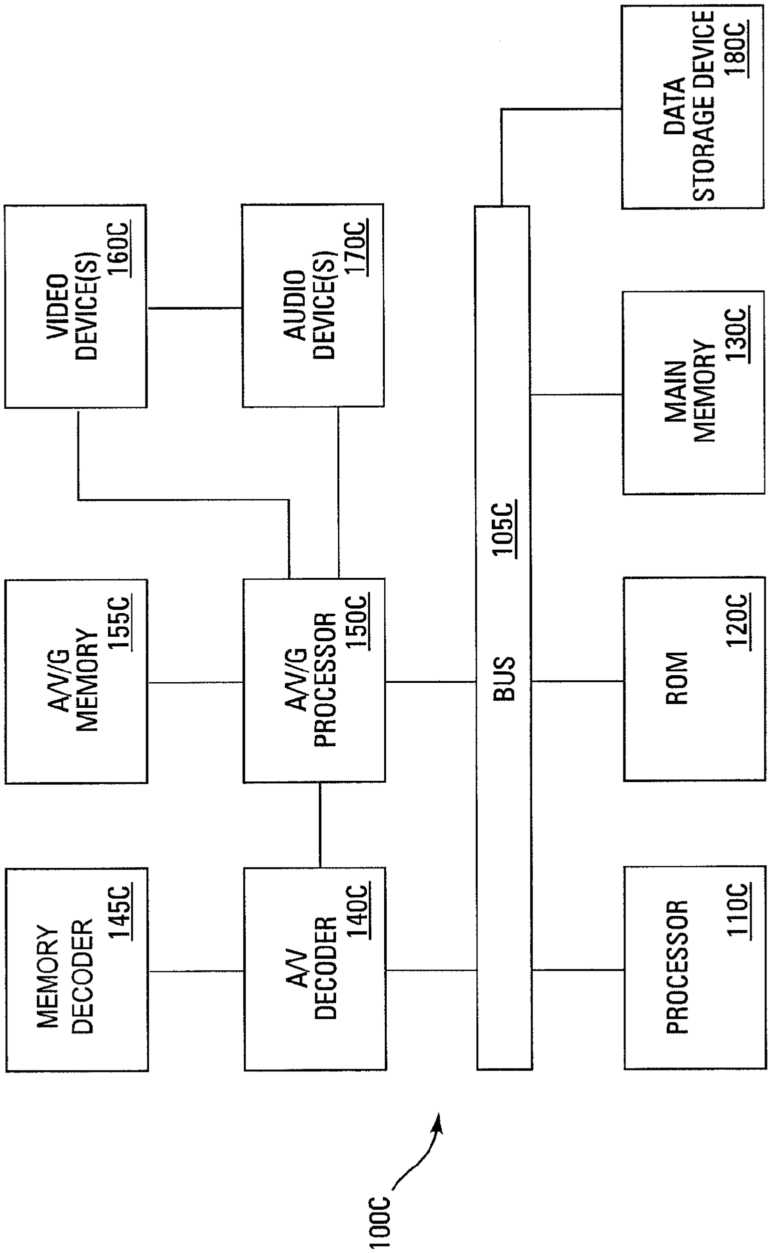
FIG. 11 shows a first schematic diagram of a video feed and processing system that can be used to compose blended images in the practice of the present invention.
Figure 12:
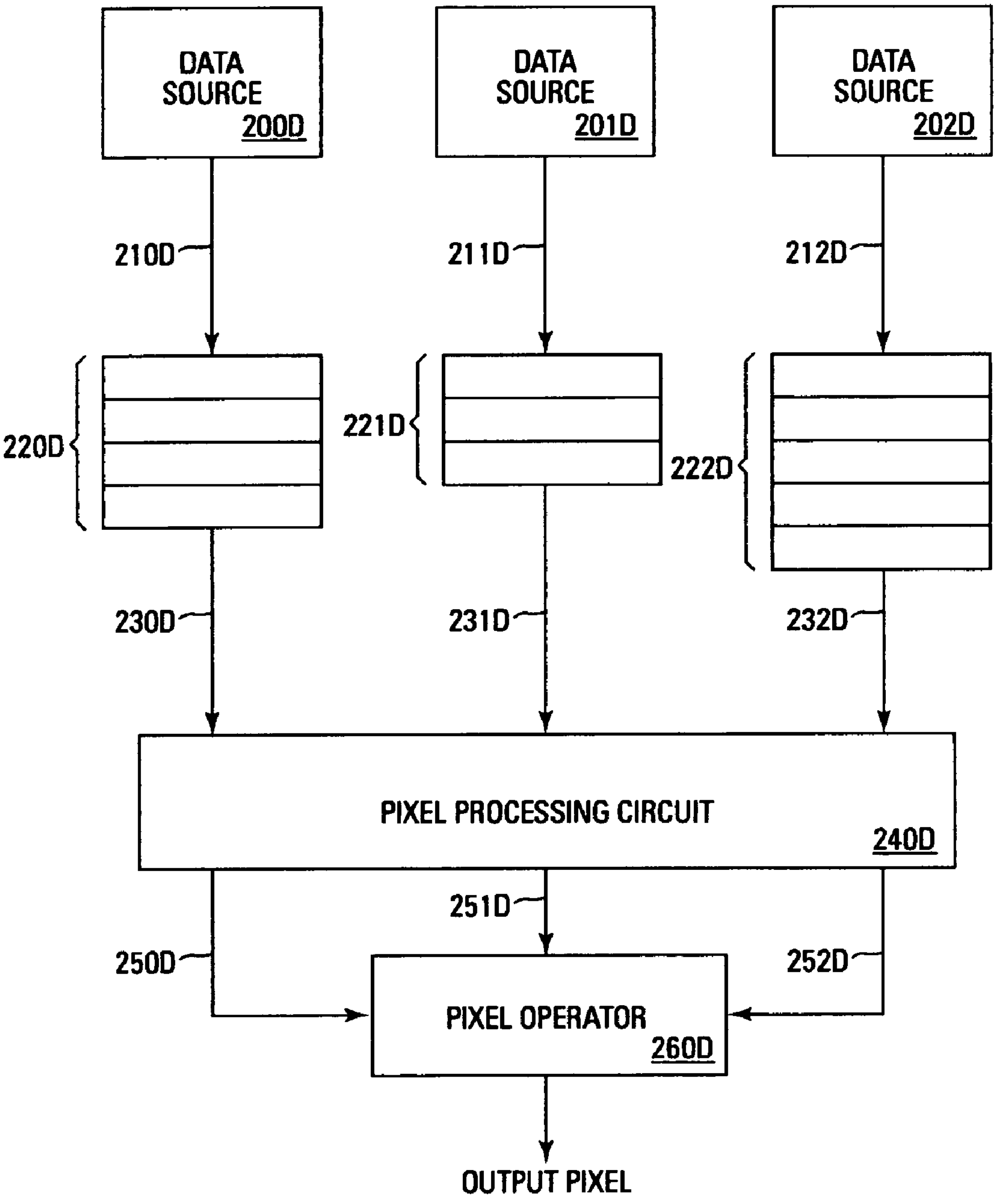
FIG. 12 shows a second schematic diagram of a video image processing system.

FIGS. 11 and 12 show the schematics of such an implemented architecture for multiple graphics sources. FIG. 11 is one embodiment of a system suitable for use with the invention. System 100C includes bus 105C or other communication device to communicate information and processor 110C (also referred to as a CPU in some embodiments) coupled to bus 105C to process information. While system 100C is illustrated with a single processor, system 100C can include multiple processors. System 100C further includes main memory 130C that can be random access memory (RAM) or other dynamic storage device, coupled to bus 105C to store information and instructions to be executed by processor 110C. Main memory 130C also can be used for storing temporary variables or other intermediate information during execution of instructions by processor 110C.

System 100C also includes read only memory (ROM) and/or other static storage device 120C coupled to bus 105C to store static information and instructions for processor 110C. Data storage device 180C is coupled to bus 105C to store information and instructions. Data storage device 180C such as a magnetic disk or optical disc and a corresponding drive may also be coupled to system 100C.

Audio/visual/graphics (A/V/G) decoder 140C is coupled to bus 105C to receive A/V/G data. A/V/G decoder 140C can also receive data directly. In one embodiment, A/V/G decoder 140C is an MPEG decoder that decodes digital A/V/G data according to one of the Motion Picture Experts Group standards (e.g., MPEG-1, MPEG-2, MPEG-4, MPEG-J, MPEG-2000). A/V/G decoder 140C can also be an analog decoder that decodes A/V/G data according to the national Television Standards Committee (NTSC) and/or Phase Alternating Line (PAL) and/or Sequentiel Couleurs a Memoire (SECAM) standards. Of course, other data communications standards can also be used. In one embodiment, memory decoder 145C is coupled to A/V/G decoder 140C for use in decoding A/V/G data. In alternative embodiments A/V/G decoder 140C does not have a dedicated memory.

A/V/G processor 150C is coupled to A/V/G decoder 140 to receive the output of A/V/G decoder 140C. A/V/G decoder 140C provides A/V/G processor 150C with one or more video data inputs and/or one or more audio data inputs. A/V/G processor 150C is also coupled to bus 105C to communicate with processor 110C and other components of system 100C. A/V/G processor 150C can also be coupled to multiple A/V/G decoders (not shown in FIG. 1).

In one embodiment, A/V/G memory 155C is coupled to A/V/G processor 150C. A/V/G memory 155C is used for A/V/G processing as described in greater detail below. In an alternative embodiment, A/V/G processor 150C uses main memory 130C for A/V/G processing rather than A/V/G memory 155C.

Video device(s) 160C and audio device(s) 170C are coupled to A/V/G processor 150C. Video device(s) 160C represents one or more devices configured to display video or other graphical data output by A/V/G processor 150C. Similarly, audio device(s) 170C represent one or more devices configured to generate audio output based on audio data generated by A/V/G processor 150C. In one embodiment, A/V/G processor 150C generates two video output channels corresponding to multi-regional graphics and video in one channel and background video on a second channel; however, other configurations can also be provided. A/V/G processor also generates one or more audio output channels based, at least in part, on corresponding input audio channels.

One embodiment of the present invention is related to the use of system 100C to provide processing of graphical information. According to one embodiment, processing of graphical information is performed by system 100C in response to processor 110C executing sequences of instructions contained in the main memory 130C. Processing of graphical information can also be performed in response to A/V/G processor 150C executing sequences of instructions stored in the main memory 130C or A/V/G memory 155C.

Instructions are provided to main memory 130C from a storage device, such as magnetic disk, a ROM integrated circuit, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software instructions.

Overview of a Pipelined Architecture for Graphical Processing

In one embodiment, data input streams are scanned according to the standard progressive sequence used in NTSC and PAL encoding. In other words, an image is scanned starting from the pixel in the top left corner horizontally across to the pixel in the top right corner of the image. The next line down in the image is scanned from left to right. This scanning pattern is repeated until the image is completely scanned. When multiple data streams are received for processing, the streams can have different widths in pixels; however, in one embodiment the various images start from the same pixel location (e.g., top left corner of the image).

FIG. 12 illustrates a general data flow of data to be processed according to the invention. In the example of FIG. 12, data rates are illustrated with arrow widths. The wider the arrow, the higher the data rate. One or more of the elements of FIG. 12 can be included in A/V/G processor 150C.

Data sources 200D, 201D and 202D represent sources of A/V data to be processed. The data sources can be, for example, analog television channels, digital television channels, DVD players, VCRs. The data stream provided by each data source can vary from the other sources depending on, for example, data format. Varying data rates are common due to color formats having different bits per pixel. For example, 8-bit color indexed format requires and 8-bit value to represent a pixel. Thus, four pixels can be transferred through a 32-bit wide data path in a single clock cycle. However, 32-bit RGB color format requires all 32 bits to represent a single pixel. Thus, only a single pixel can be transferred through a 32-bit wide data path in a single clock cycle.

In addition to varying data rates for different color formats, conversion of one or more data streams to a common format can cause different latencies based on the conversions performed. For example, conversion from indexed color formats to RGB color formats require retrieving a value from a look up table, the latency for which can vary depending on the location of the value in the table. The corresponding conversion latency varies in response to the look up latency. The example of FIG. 12 assumes that data stream 210D is graphical data in a first format where the data rate is 1 Mbyte/sec., data stream 211D is graphical data in a second format where the data rate is 2 Mbyte/sec., and data stream 212D is graphical data in a third format where the data rate is 0.3 Mbyte/sec.

Because of the varying data rates and conversion latencies, the pipeline depth associated with each data stream varies also. In the example of FIG. 12, pipeline 220D has a longer latency (represented by a number of stages) than pipeline 221D. Similarly, pipeline 222D has a longer latency than either pipeline 220D or 221D. Data streams 230D, 231D and 232D are output from pipelines 220D, 221D and 222D, respectively, and provide input to pixel processing circuit 240D.

Pixel processing circuit 240D operates on pixels received via data streams 230D, 231D and 232D. However, because data streams 230D, 231D and 232D have different data rates, the arrival of pixel data at pixel processing circuit 240D is not synchronized. In order to generate an accurate output pixel based on multiple input pixels, the pixels must, at some point in processing, be synchronized. Pixel processing circuit 240D operates on data streams 230D, 231D and 232D to synchronize the pixels received.

Pixel processing circuit 240D performs one or more operations (e.g., boolean operations, alpha blending) on the pixels received from the pixel source buffers to generate an output pixel. Pixel operator 260D receives synchronized pixels from pixel control circuit 240D via pixel streams 250D, 251D and 252D. The output pixel is used to generate an output image.

In one embodiment, the components of FIG. 12 include pixel mirroring circuitry. The pixel mirroring circuitry allows pixel processing that is independent of the horizontal scanning direction. In one embodiment, pixel source buffers included in pipelines 220D, 221D and 222D perform mirroring operations when necessary on data streams received. Pixel operator 260D reverses the mirroring operations when necessary to generate an output pixel.

Pixel mirroring allows operations performed by pixel processing circuit 240D to be the same for images that are processed from right to left and for images that are processed from left to right. The use of the same operations for right to left processing and left to right processing reduces the size and complexity of pixel processing circuit 240D as compared to a circuit designed for processing images both right to left and left to right. The ability to perform both right to left and left to right scanning is useful, for example, when overlapping images are processed.

In one embodiment mirroring is accomplished by a set of multiplexors included in the pixel source buffers of pipelines 220D, 221D and 222D; however, mirroring can be accomplished by different circuitry. Pixel mirroring reverses the order of pixels received by the pixel source buffers. The reversal of pixel ordering allows right to left scanned images to be processed with the same operations as used for left to right scanned images because the scanning order is effectively reversed by the pipeline circuitry.

For example, if a 32-bit data stream provides four 8-bit pixels, the mirroring circuitry reverses the order of the pixels received. In other words, the order of the first, second, third, and fourth pixels received as a single 32-bit word are processed by pixel processing circuit 240D as if scanned in the order of fourth, third, second, and first pixels. In one embodiment, pixel operator 260D includes circuitry to reverse the mirroring performed by the pipeline circuitry. If a mirrored image is desired, pixel operator 260D does not reverse the mirroring performed by the pipeline circuitry.

In one embodiment, pixel mirroring is supported for multiple pixel widths. For example, if a 32-bit data path is communicating 1-bit color coded pixels, the order of the bits received are reversed in a bitwise manner rather than reversing the order of bytes that are received as a 32-bit word.

U.S. Pat. No. 6,519,283 describes an integrated digital video system is configured to implement picture-in-picture merging of video signals from two or more video sources, as well as selective overlaying of on-screen display graphics onto the resultant merged signal. The picture-in-picture signal is produced for display by a television system otherwise lacking picture-in-picture capability. The digital video system can be implemented, for example, as an integrated decode system within a digital video set-top box or a digital video disc player. In one implementation, a decompressed digital video signal is downscaled and merged with an uncompressed video signal to produce the multi-screen display. The uncompressed video signal can comprise either analog or digital video. OSD graphics can be combined within the integrated system with the resultant multi-screen display or only with a received uncompressed analog video signal. This patent is also incorporated herein by reference for providing apparatus, hardware, software and processes for implementation of the imaging technology used in the practice of the present invention.

The system of U.S. Pat. No. 6,519,283 can be described as functioning with a video decoding system in accordance with the principles of the present invention. This video decoding system includes external memory, which in the embodiment shown comprises SDRAM frame buffer storage. Memory interfaces with a memory control unit. The Memory control unit receives decoded video data from a video decoder and provides video data for display through video display unit. In accordance with the principles of the present invention, the video decode system includes numerous features which implement a video scaling mode capability. For example, decimation unit is modified to include both a normal video decimation mode and a video scaling mode. Frame buffers are modified to accommodate storage of decoded video data in either full-frame format or a combination of full-frame format and scaled video format. Display mode switch logic is provided within video display unit to facilitate seamless switching between normal video mode and scaled video mode. Frame buffer pointer control is modified to provide the correct frame buffer pointers based on the novel partitioning of the frame buffers when in normal video mode and when in scaled video mode.

Operationally, an MPEG input video source is fed through memory control unit as coded MPEG-2 video data to the input of video decoder. Decoder includes a Huffman decoder, Inverse Quantizer, Inverse DCT, Motion Compensation and adder, which function as described above in connection with the video decoder. An internal processor may oversee the video decode process and may receive a signal from a host system (e.g., the main game computer/processor or central control) whenever the host desires to switch the video display between, for example, normal video display and scaled video display. This signal may be referred to as a "host controlled format change" signal. In response to host format changes, control signals are sent from an external or internal processor to Huffman decoder, Inverse Quantizer, Motion Compensation, as well as to an upsample logic, display fetch unit and display mode switch logic within a video display. These control signals direct the video decode system to switch the display output between, for example, normal video mode and scaled video mode.

Full size macroblocks of decoded video data may be sequentially output from video decoder to decimation unit where, in one embodiment, the full size macroblocks undergo one of two types of compression. First, if full size video is desired, then decimation of the B-coded pictures only is preferably performed. In this normal video mode, decimation is a process of reducing the amount of data by interpolating or averaging combined values to get an interpolated pixel value. Interpolation reduces the number of pixels, and therefore, less external memory is required in the overall system. In a second mode, decimation unit performs picture scaling in accordance with the principles of this invention. By way of example, the type of scaling employed may reduce the overall size of the display picture by a factor of 2 or 4 in both the horizontal and vertical axis.

Along with providing a decimation unit with a stream of decoded full-size macroblocks, video decoder also sends a "motion compensation unit block complete" signal on line, which lets decimation unit know when a macroblock has been completely decoded. Similarly, decimation unit provides a "decimator busy" signal on line to a motion compensation unit of a video decoder. This "decimator busy" signal informs the motion compensation unit when the decimation unit is busy and when the unit has completed its operations, after which the motion compensation unit can proceed to the next macroblock.

A motion compensation unit of the video decoder provides read video addresses directly to the memory control unit, and writes video addresses to decimation unit for writing of decoded video data (full size) and/or scaled macroblocks to internal or external memory. In parallel with the read video address and write video address, pointers are provided by frame buffer pointer control to the memory control unit. These pointers define which frame buffer areas within SDRAM are to be accessed by a given read video address or write video address in accordance with the partitionings of the frame buffer memory space. These pointers may be a current pointer and current small pointer, with current pointer comprising a pointer for a full size macroblock, and current small pointer comprising a pointer for a scaled macroblock.

Decimation unit receives the decoded full size macroblocks, buffers the information internally and if scaling mode is activated, performs scaling as described below. In a normal mode, decimation unit outputs decoded video data full-size macroblocks to memory control unit for storage in frame buffers. When in scaling mode, decimation unit scales the full-size macroblocks and outputs scaled macroblocks to memory control unit for storage in frame buffers.

A frame buffer pointer control is significant and controls rotation of the frame buffers, i.e., frame buffer assignments, when in normal video mode and video scaling mode.

The decimation unit may also functions as part of video display unit when retrieving data for display. Specifically, decoded video data comprising full-size scan lines is retrieved from frame buffer storage and fed through decimation unit 682 for B-frame re-expansion of pictures. This is done so that consistency is maintained for the video within a group of pictures, and thus reduced resolution of any one picture is not perceptible. After re-expansion, the full-size scan lines are provided to display output interface.

Alternatively, when in video scaling mode, decoded video comprising scaled scan lines is retrieved from the frame buffer storage and fed directly to scan line video buffers. The scan lines are divided between luminance and chrominance data and both a current scan line and a prior scan line are fed from scan line video buffers to vertical and horizontal upsample logic. Upsample controls are received from display fetch unit 692, which coordinates letterbox formatting, SIF upsampling, 4:2:0 to 4:2:2 upsampling, and flicker reduction.

A display fetch unit may provide the read video address for retrieval of scan lines from frame buffer storage. A "current pointer, current small pointer" synchronization signal for display is received by memory control unit from display mode switch logic of video display unit. As noted above, the current pointer, current small pointer signal points to the particular frame buffer area from which scan lines are to be retrieved, while the read video address signal designates the particular scan lines to be retrieved within that frame buffer area.

A display mode switch logic may be provided in accordance with the principles of the present invention in order to ensure seamless switching between, for example, scaled video mode and normal video mode. Logic receives an input a control signal from internal processor of video decoder, as well as a vertical synchronization (VSYNC) signal (from a display output interface) and a B picture "MPEG-2 repeat field" signal from the Huffman decoder of the video decoder. VSYNC is an external synchronization signal that indicates the start of a new display field. Output from display mode switch logic, in addition to the current pointer, current small pointer sync for the display, is a "display format sync for display" signal fed to display fetch unit, as well as a "display format sync for decode" signal fed to the decode logic of the decimation unit. The display mode switch logic also outputs a "block video" signal to display output interface which is employed, in accordance with the principles of the present invention, to block one display frame to keep noise from the display when switching between display modes. Video data is received at the display output interface from the upsample logic.

The proposed video configuration of the present invention may use two or more, or preferably, three or more distinct video layers. The first required layer is a pre-recorded dynamic dealer image performing the standard movements and audio as required by the specific game such as LET IT RIDE® poker bonus, blackjack, etc. For purposes of this disclosure, the term "dynamic" refers to an image that is changing with time and is not a still image. Such an image can be a live feed from a video camera, or a prerecorded series of images that change over time. One example of a dynamic image is a film clip of a tropical resort that shows people moving in the background, trees swaying in the wind, etc. Another example of a dynamic image is a video filmstrip of an event such as a horse race or an episode of a television program.

The second required layer is the dynamic background video. This video can be a live video feed or pre-recorded video. An example of a game environment could be the use of a tropical beach side sequence for the background and the dealer dressed in vacation attire. The combination of the two videos would present the player with a tropical beach game theme for the video table game. The types of themes could be tailored to each specific casino. Egyptian-based themes for the LUXOR™ hotel, pirate based imagery for the TREASURE ISLAND™ hotel, etc. In another example of the invention, a live video feed from the gaming floor is used as a background image. A camera or cameras can be mounted in the area proximate the MPP device so that the dealer video simulation is more realistic.

Where an at least three layer system is used, the third (and likely intermediate) layer is a key layer or sometimes referred to as a mask layer. This layer provides the active separation mask that distinguishes the foreground from the background.

The video background can itself be a composite video feed. This would require more key/mask layers as well as the additional video layers.

Additionally, other feeds can be superimposed upon the background feed to add more interest in the game. The result would be a background video with another nested video. For example, the primary background video could be the beach sequence describe previously with another secondary video embedded in the upper left corner of a popular sporting event such as a football game. This could also be accomplished by use of the Picture-in-Picture (PIP) feature included on most large screen televisions. The nested video feed in the upper left corner could alternatively be presented on top of a still image alone. This would produce a virtual dealer on top of still image background with a smaller video feed embedded in the upper left corner. This nesting, in addition to the dealer-foreground/theme-background overlay enables the display of direct cable feed or TV feed to the dealer display unit, enabling players to keep informed of breaking news events or sports events while at the table.

The concept and practice of the present invention can be taken further to incorporate both a relevant theme and a relevant event. Such incorporated elements might include a primary background dynamic video sequence of a horse race track early in the morning and a secondary dynamic live video sequence of a horse race in progress. Or a taped or live video feed of another gaming-related event such as the "World Series of Poker", for example, hosted by Binion's Horse Shoe could be broadcasted on poker tables.

The hardware configuration to accomplish the video composite can be selected from amongst the types of systems described above, with designer selection of the appropriate feed means. The designers have contemplated various video compositing technologies, storage systems, communication systems and the best equipment to incorporate into the TABLE MASTER™ MPP gaming system. The most basic components are MPEG decoder cards and linear keyers. This video hardware is commonly off-the-shelf technology and readily available, such as direct video feed from cable, optical fiber, CD-ROM, tape, or any other image storage system. A converter or decoder would be needed for each type of image feed provided. Multiple systems may also be used, such as using a stored library of dealer movements and sounds on CD-ROM and using a live video feed for the background, without or without storage of the background image.

The equipment takes each of the individual video feeds (dealer, one or more mask layers, background, and one or more superimposed additional feeds) and combines them into a single feed. A single composite feed is then sent to the rear projection TV/monitor of the TABLE MASTER™ MPP for display to the players.

All of the apparatus, devices and methods disclosed and claimed herein can be made and executed without undue experimentation in light of the present disclosure. While the apparatus, devices and methods of this invention have been described in terms of both generic descriptions and preferred embodiments, it will be apparent to those skilled in the art that variations may be applied to the apparatus, devices and methods described herein without departing from the concept and scope of the invention. More specifically, it will be apparent that certain elements, components, steps, and sequences that are functionally related to the preferred embodiments may be substituted for the elements, components, steps, and sequences described and/or claimed herein while the same of similar results would be achieved. All such similar substitutions and modifications apparent to those skilled in the art are deemed to be within the scope and concept of the invention as defined by the appended claims.

What is claimed is:

1. An automated wagering gaming event system, comprising:

at least two distinct video displays, a first dealer video display for showing a dealer in a card game and at least a second video display showing playing cards provided to individual players;

at least one processor for enabling play of the automated wagering gaming event system;

a live camera feeding live video data to the at least one processor;

multiple player positions to enable multiple players to play the card game;

wherein the at least one processor is connected to at least two distinct feeds of video information so that the at least one processor is fed at least two different multiple video images and merges the at least two multiple video images to form a composite image of a dealer against a background, the at least one processor having a feed from a live video image from a live camera that is one of at least two distinct feeds that is merged and provides a background component for a video feed of the image of the dealer that is virtually merged on the first dealer video display screen to show a dealer with a live video image background.

2. The automated wagering game event system of claim 1, wherein a picture-in-picture image is positioned into at least one of the first dealer video display or the second video display.

3. The automated wagering gaming event system of claim 1, wherein a multiple number of background images are stored in files and the files are connected through a feed into the at least one processor for a dealer foreground image and are available for feed into the first dealer video display, wherein at least one background image is a dynamic background image.

* * * * *